US011877377B2

(12) United States Patent
Smit et al.

(10) Patent No.: US 11,877,377 B2
(45) Date of Patent: Jan. 16, 2024

(54) METHOD OF SETTING A FILAMENT DEMAND IN AN X-RAY APPARATUS, CONTROLLER, X-RAY APPARATUS, CONTROL PROGRAM AND STORAGE MEDIUM

(71) Applicant: NIKON METROLOGY NV, Leuven (BE)

(72) Inventors: Bennie Smit, Hertfordshire (GB); Alexander Charles Wilson, Hertfordshire (GB)

(73) Assignee: NIKON METROLOGY NV, Leuven (BE)

( * ) Notice: Subject to any disclaimer, the term of this patent is extended or adjusted under 35 U.S.C. 154(b) by 145 days.

(21) Appl. No.: 17/442,895

(22) PCT Filed: Mar. 6, 2020

(86) PCT No.: PCT/EP2020/056013
§ 371 (c)(1),
(2) Date: Sep. 24, 2021

(87) PCT Pub. No.: WO2020/193103
PCT Pub. Date: Oct. 1, 2020

(65) Prior Publication Data

US 2022/0191998 A1 Jun. 16, 2022

(30) Foreign Application Priority Data

Mar. 26, 2019 (GB) ..................................... 1904168

(51) Int. Cl.
*H05G 1/34* (2006.01)
*H05G 1/10* (2006.01)
*H05G 1/54* (2006.01)

(52) U.S. Cl.
CPC ................ *H05G 1/34* (2013.01); *H05G 1/10* (2013.01); *H05G 1/54* (2013.01)

(58) Field of Classification Search
CPC ........................................................ H05G 1/34
See application file for complete search history.

(56) References Cited

U.S. PATENT DOCUMENTS 4,366,575 A 12/1982 Bax
5,077,773 A 12/1991 Sammon
(Continued)

FOREIGN PATENT DOCUMENTS

EP 2087843 8/2009
JP H08273889 A 10/1996

OTHER PUBLICATIONS

International Search Report in related International Application No. PCT/EP2020/056013 dated Oct. 1, 2020, 5 pages.
(Continued)

*Primary Examiner* — Chih-Cheng Kao
(74) *Attorney, Agent, or Firm* — Andrew M. Calderon; Calderon Safran & Cole P.C.

(57) ABSTRACT

There is provided a method of setting a filament demand in an x-ray apparatus. The x-ray apparatus has a filament, through which the passing of a heating current allows thermionic emission of electrons from the filament. The x-ray apparatus has a target, arranged to generate x-rays from the electrons emitted from the filament. The x-ray apparatus has a detector, arranged to detect x-rays generated by the target for forming an x-ray image. The x-ray apparatus has a controller configured to perform a measurement operation of the x-ray apparatus. The measurement measures a parameter of the x-ray apparatus. The controller is configured to set a filament demand for the filament. The filament demand correlates with the current passed through the filament. The method comprises varying the filament
(Continued)

demand between a first value corresponding to a lower filament current and a second value corresponding to a higher filament current. The method comprises measuring the parameter at a series of values of the filament demand between the first value and the second value. The method comprises detecting a knee in the measured parameter. The method comprises determining the filament demand corresponding to the detected knee in the parameter. The method comprises setting the filament demand for the x-ray apparatus based on the determined filament demand corresponding to the detected knee in the parameter.

35 Claims, 13 Drawing Sheets

(56) References Cited

U.S. PATENT DOCUMENTS

| | | | | |
|---|---|---|---|---|
| 5,388,138 | A | 2/1995 | Fujiwara | |
| 2004/0119023 | A1 | 6/2004 | Nakasuji | |
| 2017/0150589 | A1 | 5/2017 | Endo et al. | |
| 2018/0315579 | A1 * | 11/2018 | Yonezawa | H01J 37/244 |
| 2021/0217163 | A1 * | 7/2021 | Liu | A61B 6/52 |

OTHER PUBLICATIONS

Written Opinion in related International Application No. PCT/EP2020/056013 dated Oct. 1, 2020, 10 pages.
Potts P.J., “Electron probe microanalysis”, Handbook of Silicate Rock Analysis, Springer, Boston, Jan. 1, 1992, Abstract.
International Search Report and Written Opinion in related International Application No. PCT/EP2020/056013 dated Jun. 15, 2020, 19 pages.
Search Report in related GB Application No. GB1904168.0 dated Sep. 18, 2019, 1 page.
Potts P.J., “Electron probe microanalysis”, Handbook of Silicate Rock Analysis, Springer, Boston, Jan. 1, 1992, 57 pages.
Translation of Japanese Office Action in related JP Application No. 2021-557147 dated Jul. 25, 2023, 3 pages.

* cited by examiner

METHOD OF SETTING A FILAMENT DEMAND IN AN X-RAY APPARATUS, CONTROLLER, X-RAY APPARATUS, CONTROL PROGRAM AND STORAGE MEDIUM

The present invention relates to methods of setting filament demand in X-ray apparatus, controllers for X-ray apparatus, X-ray apparatus, control programs for X-ray apparatus, and non-transitory storage media containing implements implementing such methods.

BACKGROUND

In an X-ray apparatus, a filament is heated by a heating current to allow thermionic emission of electrons from the filament. These electrons are accelerated under an accelerating voltage to impinge on a target including a relatively high atomic-number (high-Z) element, thereby to generate an X-ray beam from the target. Such an X-ray beam may be directed toward a sample of interest, and the transmitted X-rays detected by a detector to form, for example, an image. Since different materials attenuate X-rays to different extents, such an image may be used to interpret the structure of the sample.

Generally, in an X-ray apparatus, it is desirable to obtain a high-quality image. Among the parameters affecting the quality of the image obtained is the temperature of the filament, as this determines the amount of electrons produced at the filament by thermionic emission. However, it is difficult for a user to correctly set the filament temperature so as to obtain appropriate image quality.

Typically, the filament in an X-ray apparatus is heated by passing a current through the filament, so as to heat the filament by resistive heating. The current supplied to the filament, or a quantity that correlates with it, is typically referred to as the filament demand.

Often, the user requires a high skill level in order to appropriately set the filament demand. The process is labour intensive and generally requires a high degree of knowledge in X-ray apparatus and the physics behind it. This limits the utility of x-ray systems and makes the development of highly automated or turn-key x-ray systems difficult.

Accordingly, there is a need for improved methods of setting a filament demand in an X-ray apparatus, as well as improved X-ray apparatus and components thereof which are able to implement such a method.

In particular, there is a need for x-ray apparatus having one or more of less complexity for the user, a higher degree of automation, longer filament life time and more reliable filament life time, a greater degree of assurance about the proper functioning of the apparatus, and more reliable image quality, and particularly those in which one or more of these needs can simultaneously be satisfied.

SUMMARY

According to a first aspect of the present invention, there is provided a method of setting a filament demand in an x-ray apparatus. The x-ray apparatus has a filament, through which the passing of a heating current allows thermionic emission of electrons from the filament. The x-ray apparatus has a target, arranged to generate x-rays from the electrons emitted from the filament. The x-ray apparatus has a detector, arranged to detect x-rays generated by the target for forming an x-ray image. The x-ray apparatus has a controller configured to perform a measurement operation of the x-ray apparatus. The measurement measures a parameter of the x-ray apparatus. The controller is configured to set a filament demand for the filament. The filament demand correlates with the current passed through the filament. The method comprises varying the filament demand between a first value corresponding to a lower filament current and a second value corresponding to a higher filament current. The method comprises measuring the parameter at a series of values of the filament demand between the first value and the second value. The method comprises detecting a knee in the measured parameter. The method comprises determining the filament demand corresponding to the detected knee in the parameter. The method comprises setting the filament demand for the x-ray apparatus based on the determined filament demand corresponding to the detected knee in the parameter.

The controller may be configured to determine the parameter on the basis of the detection of the x-rays by the detector.

The parameter may be an objective measurement of image quality.

The parameter may correlate with one of the sharpness, noise, dynamic range, resolution or contrast of an x-ray image derived from the x-rays received by the detector.

The parameter may correlate with the contrast-to-noise ratio of an x-ray image derived from the x-rays received by the detector.

The parameter may correlate with the intensity of the x-rays received by the detector.

The parameter may be a measurement of the contrast-to-noise value in an x-ray image derived from the x-rays received by the detector.

The parameter may correlate with a beam current between the filament and the target, an electron beam spot size on the target, or an electron beam spot intensity on the target.

The setting of the filament demand may comprise setting a filament demand which is equal to the filament demand corresponding to the identified knee.

The setting of the filament demand may comprise setting a filament demand which is lower than the filament demand corresponding to the identified knee by a predetermined proportional or absolute amount.

The setting of the filament demand may comprises setting a filament demand which is higher than the filament demand corresponding to the identified knee by a predetermined proportional or absolute amount.

The identifying of the knee may comprise determining a slope of the measured parameter as a function of the filament demand. The identifying of the knee may comprise selecting a value of the filament demand based on the determined curvature as the value of the knee.

The identifying of the knee may comprise determining a value of filament demand at which the determined slope of the measured parameter is decreased to a set percentage of a maximum slope of the measured parameter between the first value and the second value.

The determined point may be the first such value determined between the first value and the second value, in order.

The filament demand may represent a set operating filament current.

The filament demand may represent a set operating filament voltage.

The method may be repeated at intervals over a service life of the filament.

The intervals may be predetermined intervals based on an elapsed clock time since the previous repetition of the method of the first aspect.

The intervals may be predetermined intervals based on an elapsed operating time since the previous repetition of the method of the first aspect.

The method may further comprise a process of calculating a remaining lifetime of the filament based on the set filament demand.

The process of calculating the remaining lifetime of the filament may comprise comparing the set filament demand to a predetermined representation relating set filament demand to filament lifetime. The process of calculating the remaining lifetime of the filament may comprise determining the remaining filament lifetime based on the comparison.

The set filament demand may be recorded for each repetition or a subset of repetitions of the setting of the filament demand along with accumulated operating time of the filament. The process of calculating the remaining lifetime of the filament may comprise comparing a representation of the set filament demand dependent on accumulated operating time to a predetermined representation of expected set filament demand against operating time. The process of calculating the remaining lifetime of the filament may comprise determining the filament lifetime based on the comparison.

The predetermined representation of set filament demand against remaining filament lifetime may be an analytic representation.

The predetermined representation of set filament demand against remaining filament lifetime may be a curve or set of values.

The predetermined representation of set filament demand against remaining filament lifetime may be theoretically determined.

The predetermined representation of set filament demand against remaining filament lifetime may be empirically determined.

The predetermined representation may be established on the basis of received information relating set filament demand to remaining filament lifetime for a range of values of filament demand and remaining filament lifetime.

The predetermined representation may be established based on previously-recorded values of set filament demand and accumulated operating time of a previously-installed filament in the x-ray apparatus.

The filament demand may be changed to a different filament demand after a beam current between the filament and the target or a potential between the filament and the target is changed.

The filament demand may be changed to a different filament demand by repeating the varying, detecting, determining and setting steps of the first aspect.

The filament demand may be changed to a different filament demand on the basis of a predetermined relationship between the filament demand, the beam current and the potential.

The predetermined relationship may be a relationship between the filament demand and one of the beam current and the potential, the ratio being associated with the other of the beam current and the potential.

The predetermined relationship may be determined by a map defining filament demand for each of pairs of beam current and potential.

According to a second aspect of the present invention, there is provided a controller for an x-ray apparatus. The controller comprises data-processing equipment configured to cause the x-ray apparatus to perform a method in accordance with the first aspect.

According to a third aspect of the present invention, there is provided x-ray apparatus comprising a controller in accordance with the second aspect.

According to a fourth aspect of the present invention, there is provided a control program for an x-ray apparatus. The control program comprises machine-readable instructions which, when executed, cause the x-ray apparatus to perform a method in accordance with the first aspect.

According to a fifth aspect of the present invention, there is provided a non-transitory storage medium storing a control program in accordance with the fourth aspect.

By applying the invention according to any one of the first to fifth aspects, or embodiments and implementations thereof, improvements in setting a filament demand in an X-ray apparatus may be obtained, as well as improvements in filament life and improvements in the prediction of remaining filament life, as will be apparent to those skilled in the art on consideration of the following exemplary, illustrative and non-limiting Description and Drawings.

BRIEF DESCRIPTION OF THE DRAWINGS

For a better understanding of the present invention, and to show how the same may be carried into effect, reference will be made, by way of example only, to the accompanying drawings, in which.

DETAILED DESCRIPTION

Figure 1:
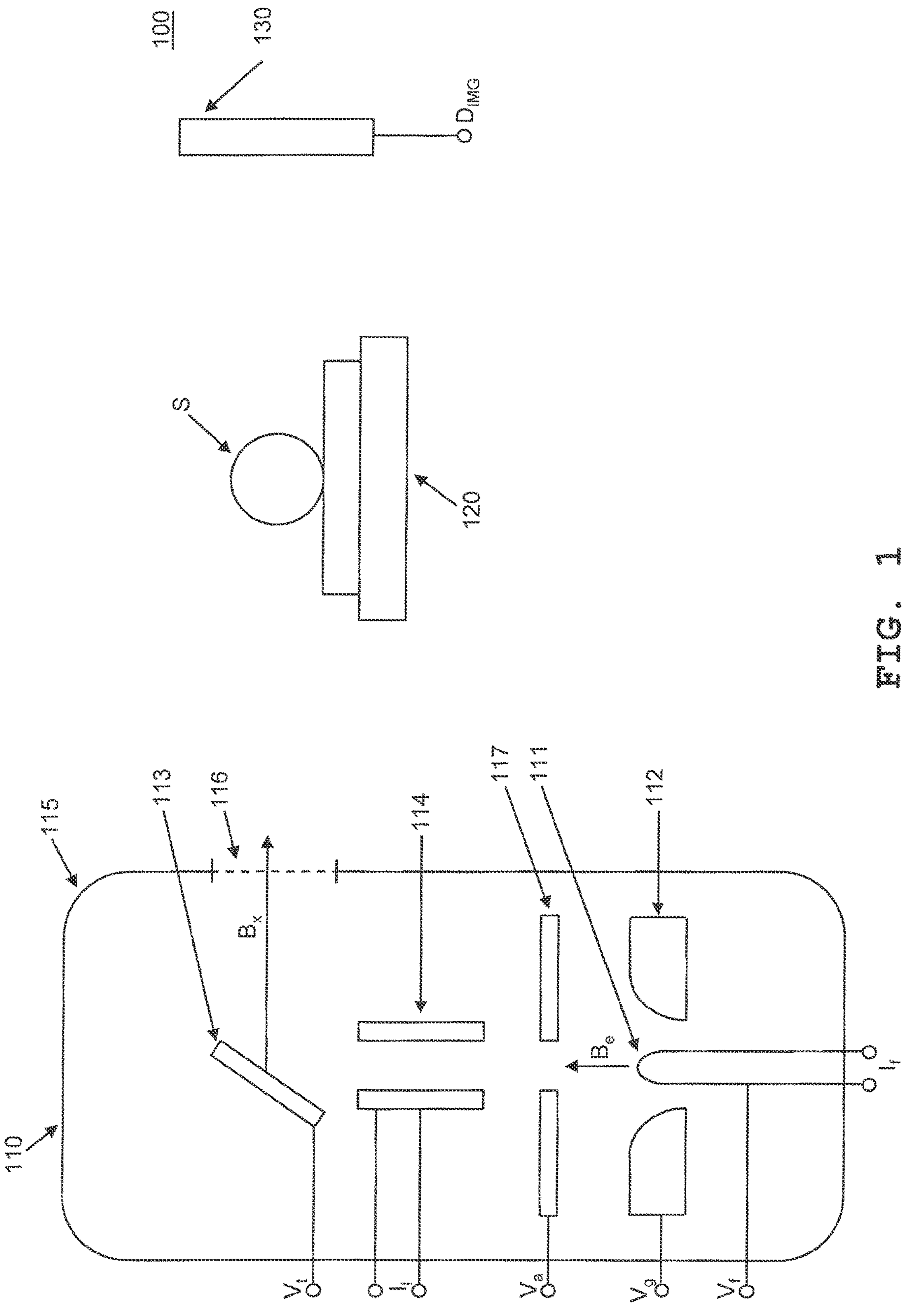
FIG. 1 shows a schematic of an x-ray apparatus implementing the present invention.

FIG. 1 shows a configuration of an X-ray apparatus in which the present invention may be implemented. X-ray apparatus 100 has an X-ray generator 110 which emits an X-ray beam $B_x$ towards X-ray detector 130.

X-ray apparatus 100 also comprises a sample mount 120 arranged for supporting a sample S under observation in the path of X-ray beam $B_x$ from X-ray generator 110 to X-ray detector 130.

X-ray detector 130 is arranged to generate image data $D_{IMG}$ based on the X-rays of X-ray beam $B_x$ received at X-ray detector 130 which have passed through sample S, and to make available the image data $D_{IMG}$ for further processing. The image represented by image data $D_{IMG}$ image may reveal details of the internal structure and composition of sample S.

X-ray generator 110 is provided with filament 111 which is formed of a metal, such as tungsten, which relatively easily undergoes thermionic emission. As an alternative, a composite filament may be used, such as a filament formed of a metal such as nichrome, having a relatively high resistance, coated with a material, such as tungsten, which coating material relatively easily undergoes thermionic emission. Also known and usable are doped filaments containing a small percentage of another material, such a filament formed of tungsten with around 2% thorium. Such filaments may exhibit improved thermionic emission properties. Filament 111 is set at a negative potential to promote the thermionic emission of the electrons. Such a negative potential is typically chosen by the user of the x-ray apparatus according to a desired emitted spectrum and intensity of x-rays, and may be set, for example, at −160 keV.

Arranged surrounding and extending slightly behind filament 111 is a grid electrode 112, sometimes referred to as the Wehnelt, which provides a local negative potential around the filament for repelling electrons emitted by the filament to form an electron beam $B_e$ travelling away from the filament. The form of the grid electrode, which is well understood by those in the art, also serves as a convergent electrostatic lens to converge the emitted electrons into a beam.

Another function provided by grid electrode 112 is to regulate the electron beam current from filament 111 as the temperature of filament 111, and hence the quantity of free electrons emitted by filament 111 changes. For a given filament temperature, the potential of the grid electrode 112 relative to the potential of the filament 111 controls the equipotential lines in the vicinity of the tip of the filament 111. If the grid electrode 112 becomes more negative, the equipotential lines raise towards the tip of the filament such that fewer of the free electrons generated at the tip of the filament are accelerated to form an electron beam $B_e$. Accordingly, the electron beam current from filament 111 can be set at a defined value, termed the beam current set point, by appropriate control of the potential of the grid electrode 112 relative to the filament 111 as the filament temperature changes. The potential of the grid electrode may vary by, for example, about 1% of the potential of the filament 111. For example, if the filament 111 is set to be at a potential of −160 keV, then the potential of the grid electrode 112 may be adjusted to be at the same or at a relatively more negative potential than the filament 111. Such adjustment, as described later, can be performed automatically based on the desired electron beam current.

Arranged opposed to filament 111 is target 113, which comprises an x-ray generating material such as tungsten, rhodium or molybdenum such that an electron beam Be, incident on target 113, causes emission of a beam $B_x$ of X-rays from the target 113. The choice of target material may influence the emitted spectrum of x-rays. Target 113 may be connected to ground, or may be connected to a potential different from ground, such as a positive potential, in order to attract and accelerate the electrons of the electron beam $B_e$ towards it.

Also arranged between filament 111 and target 113 is anode electrode 117. In some embodiments, anode electrode 117 may be connected to ground, or may be a potential of which is adjustable to provide further control of the flux and energy of the electrons of electron beam $B_e$ between the filament 111 and the anode electrode 117. The anode electrode 117 has the shape of a disc having a through-hole in the centre and dimensioned to allow the beam to pass.

Also arranged between filament 111 and target 113, and on the target side of anode electrode 111, is focusing coil 114, the current $I_l$ in which can be adjusted to control the focus of the electron beam $B_e$ striking target 113. Focusing coil 114 has the form of a cylindrical coil dimensioned to allow the electron beam $B_e$ to pass.

All of the filament 111, grid electrode 112, anode electrode 117, target 113, and focusing coil 114 are contained within enclosure 115, which is sealable so as to support a vacuum inside. Enclosure 115 may thereby be brought to a condition of relative vacuum, so as to allow free transmission of the electron beam Be from filament 111 to target 113. Forming part of enclosure 115 is window 116, which may be formed of a material which is relatively transmissive to X-rays but relatively opaque to electrons, such as beryllium. Window 116 allows the beam $B_x$ to pass out of enclosure 115.

The entire X-ray apparatus 100 is typically provided with a radiodense enclosure, not shown, which serves to prevent leakage of X-rays to the exterior of the X-ray apparatus.

Filament 111 is heated by passing a current $I_f$, which may be an alternating current or which may be a DC current, through the filament. As explained above, to promote the thermionic emission of electrons from the filament, the filament is set at a relatively negative potential $V_f$. Also as explained above, to control the emission of electrons from the heated filament 111, grid electrode 112 is set at a negative potential $V_g$, which is typically relatively more negative than the potential $V_f$ of the filament. In one embodiment, target 113 is set at ground potential, but in other embodiments, for example to encourage the acceleration of electrons onto the target 113, target 113 may be set at a target potential $V_t$.

Appropriate electrical connections are provided traversing enclosure 115 to connect the various elements of X-ray generator 110 to respective power supplies for supplying the necessary currents and potentials.

The current of the focus coil 114 is set at a focusing current $I_l$.

Figure 2:
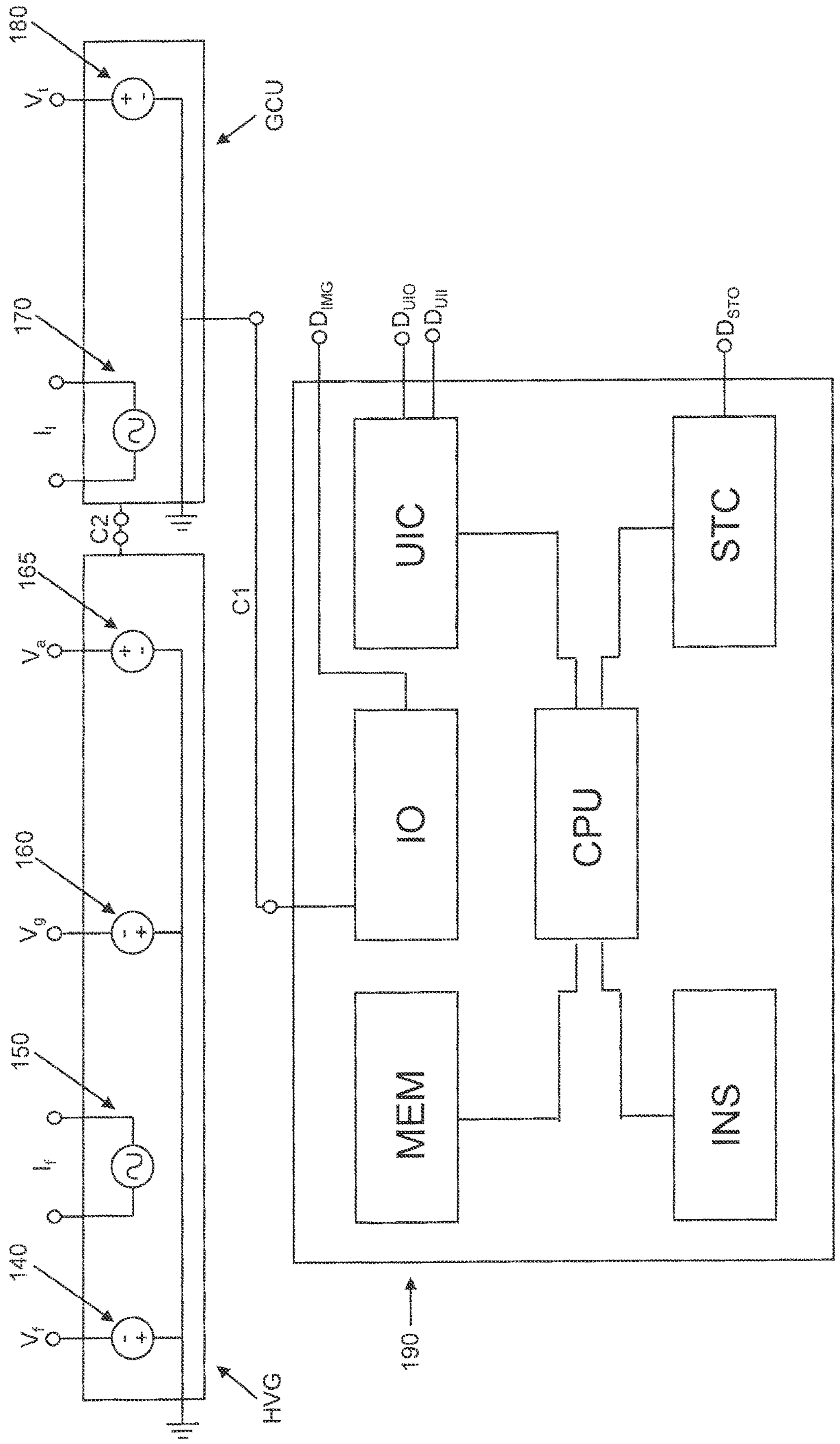
FIG. 2 shows a schematic of a controller for an x-ray apparatus implementing the present invention.

Each of the electrical connections to X-ray generator 100 is connected to an appropriate power supply, as shown in FIG. 2, which shows the power supply and control arrangements for the X-ray apparatus 100.

For example, X-ray apparatus is provided with a filament potential supply 140 which supplies potential $V_f$ to the filament 111. X-ray apparatus 100 is also provided with a filament current supply 150, which provides a filament current $I_f$ through filament 111. X-ray apparatus 100 is provided with a grid potential supply 160, which supplies a grid potential $V_g$ to grid electrode 112. X-ray apparatus is also provided with an anode potential supply 165, which supplies an anode potential $V_a$ to anode electrode 117. X-ray apparatus 100 is also provided with focusing coil current supply 170 which supplies a focus current $I_l$ to focus coil 114. X-ray apparatus 100 is also provided with target potential supply 180, which supplies target potential $V_t$ to target 113.

Each of the filament potential supply 140, the filament current supply 150, the grid potential supply 160, the anode potential supply 165, the focus coil current supply 170, and the target potential supply 180 may be provided as a discrete unit, or may be integrated in an overall power supply section. In one variant, the filament current supply 150 and the filament potential supply 140 may be provided by a common filament current and potential supply.

In the disclosed configuration, the filament potential supply 140, filament current supply 150, grid potential supply 160 and anode potential supply 165 form part of an overall high voltage generator HVG.

In the disclosed configuration, focusing coil current supply 170 and target potential supply 180, which supplies target potential $V_t$ to target 113, form part of an overall gun control unit GCU.

In the disclosed configuration, gun control unit GCU sends and receives control and status signals from controller 190, over control signal C1. Gun control unit GCU has a subsidiary control link C2 for sending control and status signals to high voltage generator HVG. Such signals may be analogue signals, such as analogue potentials varying across a defined range to define analogue quantities, or may be digital signals, such as digital potentials corresponding to high or low digital values to define digital quantities. A combination of analogue or digital control signals may also be implemented, without limitation.

In the disclosed configuration, controller 190 controls high voltage generator HVG indirectly, that is, intermediated by gun control unit GCU. Gun control unit GCU may relay signals to and from high voltage generator HVG on behalf of controller 190, or may itself embody control functions which could otherwise be performed by controller 190. The precise distribution of control functions may be varied.

Each of the filament potential supply 140, the grid potential supply 160, the focus coil current supply 170, and the target potential supply 180 has been shown as providing its appropriate potential relative to a ground potential. However, in variant arrangements, certain of the various potential supplies may be configured to provide their assigned potential relative to one of the other potentials in the system, without limitation. In particular, the target potential $V_t$ and the anode potential $V_a$ may be connected directly to ground. In some configurations, the current in focus coil 114 may be controlled by a potential supply rather than a current supply. In the present embodiment, a DC current supply is used.

The various supplies described above are, in the present configuration, controlled by controller 190, which, as shown in FIG. 2, comprises a central processing unit CPU connected to a memory MEM, an instruction store INS, an input/output unit IO, a storage controller STC, and a user interface controller UIC.

Each of the memory MEM, the instruction store INS, the user interface controller UIC, the storage controller STC, and the input/output unit IO is connected to central processing unit CPU, such that the central processing unit CPU can control and intermediate the various functions of the recited elements of controller 190.

For example, instruction store INS may store machine-readable instructions which determine the operation of controller 190. Memory MEM may store data values associated with the operation of controller 190, including parameter values relating to the control of the X-ray apparatus and acquired image data relating to acquired x-ray images. Input/output unit IO may send and receive data between the controller 190 and elements of the exposure apparatus 100 which are under control of controller 190, such as the filament potential supply 140, the filament current supply 150, the grid potential supply 160, the anode potential supply 165, the focus coil current supply 170, and the target potential supply 180, as well as other aspects of the apparatus, without particular limitation. User interface controller UIC allows controller 190 to output user interface output data $D_{UIO}$ to a user interface output unit, such as a display or discrete output elements, such as visual and audible elements of a control panel, and to read user interface input data from $D_{UII}$ from a user interface input unit, which may be, for example, a peripheral such as a keyboard and/or mouse, but which also may be interactive input elements formed as part of a control panel.

In the present configuration, controller 190 also controls the reading of image data $D_{IMG}$ from the X-ray detector 130 shown in FIG. 1, and the processing of such data. Alternatively, the reading of data $D_{IMG}$ from X-ray detector 130 may be performed by a separate image acquisition system, or can be provided in a hybrid configuration in which controller 190 acquires image data $D_{IMG}$ from X-ray detector 130 but then transfers it to another unit for further processing.

In the present configuration, controller 190 is provided with a storage controller STC, which allows writing of storage data $D_{STO}$, which may include acquired image data $D_{ing}$, to an external storage device such as a hard drive or storage area network.

Although controller 190 is, in the present configuration, provided to control all material aspects and functions of X-ray apparatus 100, on the basis of instructions provided by a user through the user interface controller UIC or on the basis of instructions retrieved from instruction store INS, or on a combination of both, the present disclosure relates in one aspect to the use of controller 190 in the setting of the filament demand, here corresponding to the filament current $I_f$ to be passed through filament 111. The method will be explained with reference to the flow diagram of FIG. 5, with reference also to the curves of FIG. 3 and the schematic representations of the potential at the filament shown in FIGS. 4A to 4C.

Firstly, in step S110, the controller establishes the initial settings of the x-ray apparatus 100, for example, filament potential $V_f$, the grid potential $V_g$, the focus current $I_l$, the anode potential $V_a$, and the target potential $V_t$, while maintaining the filament demand $I_f$ at a low value $I_o$, for example a zero value or an initial value insufficient to establish a significant amount of thermionic emission. Accordingly, in this state, there is no or negligible electron beam current $B_e$.

In the present embodiment, the filament demand is identical to the filament current. In other embodiments, the filament demand may be a quantity that correlates with the filament current, such as voltage across the filament, or may be an arbitrary parameter which is related to the filament current or the filament voltage by a scaling and/or offset relationship.

The values of some or all of the various potentials $V_s$, $V_f$, $V_g$, $V_l$, $V_t$ and current $I_l$ may be set according to predetermined values stored in memory MEM, such as last-used values or default values, or may be received through user interface controller UIC from a user input device such as a control console or control panel according to the intended functioning of the device. In some embodiments, these values may be specified directly by the user; in other embodiments, these values may be determined by controller 190 based on required performance parameters such as desired beam current $I_B$ and desired beam accelerating potential $V_B$. In a turn-key or highly-automated system, for example, these values may be determined based on a user selection of an imaging operation to be performed.

Typically, these potentials should be such as to allow an electron beam to be established between filament 111 and anode 117, and eventually to target 113, once thermionic emission has been established at filament 111 by passing sufficient filament current $I_f$ so as to heat the filament and generate free electrons.

Figure 4A:
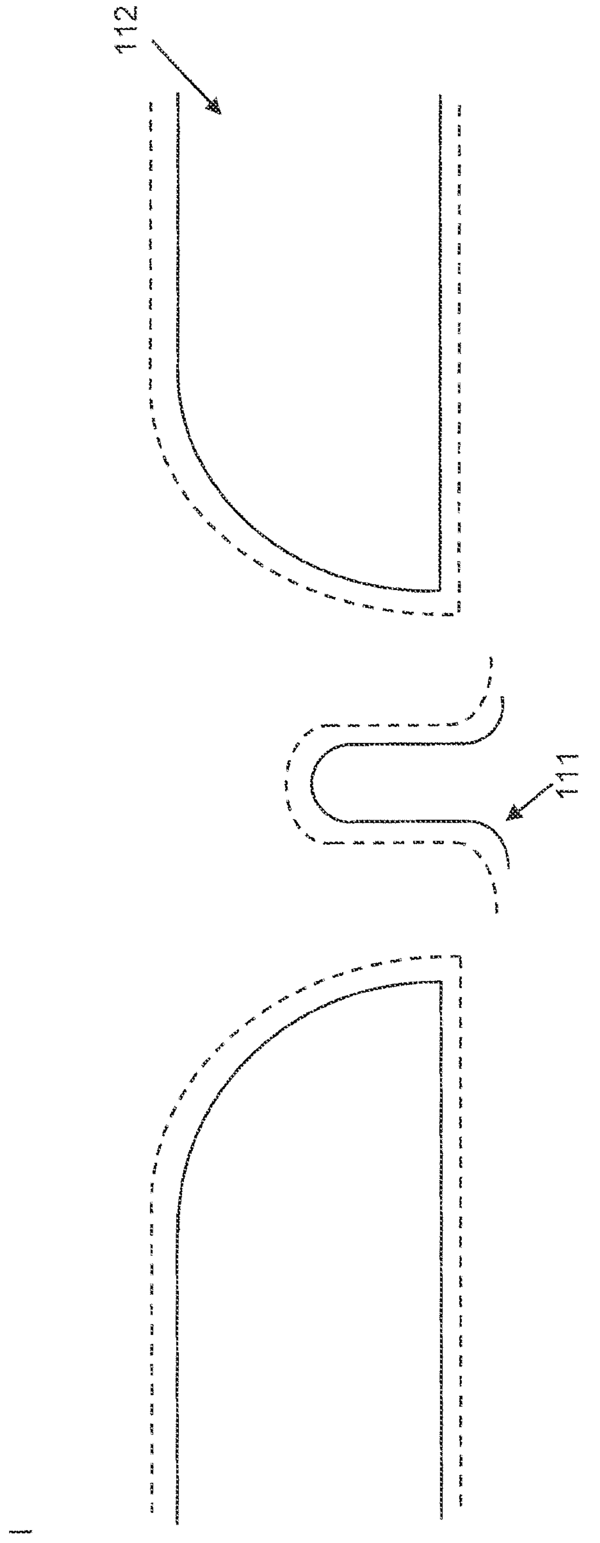
FIG. 4A shows a potential at the filament at a state corresponding to state I shown in FIG. 3.
Figure 5A:
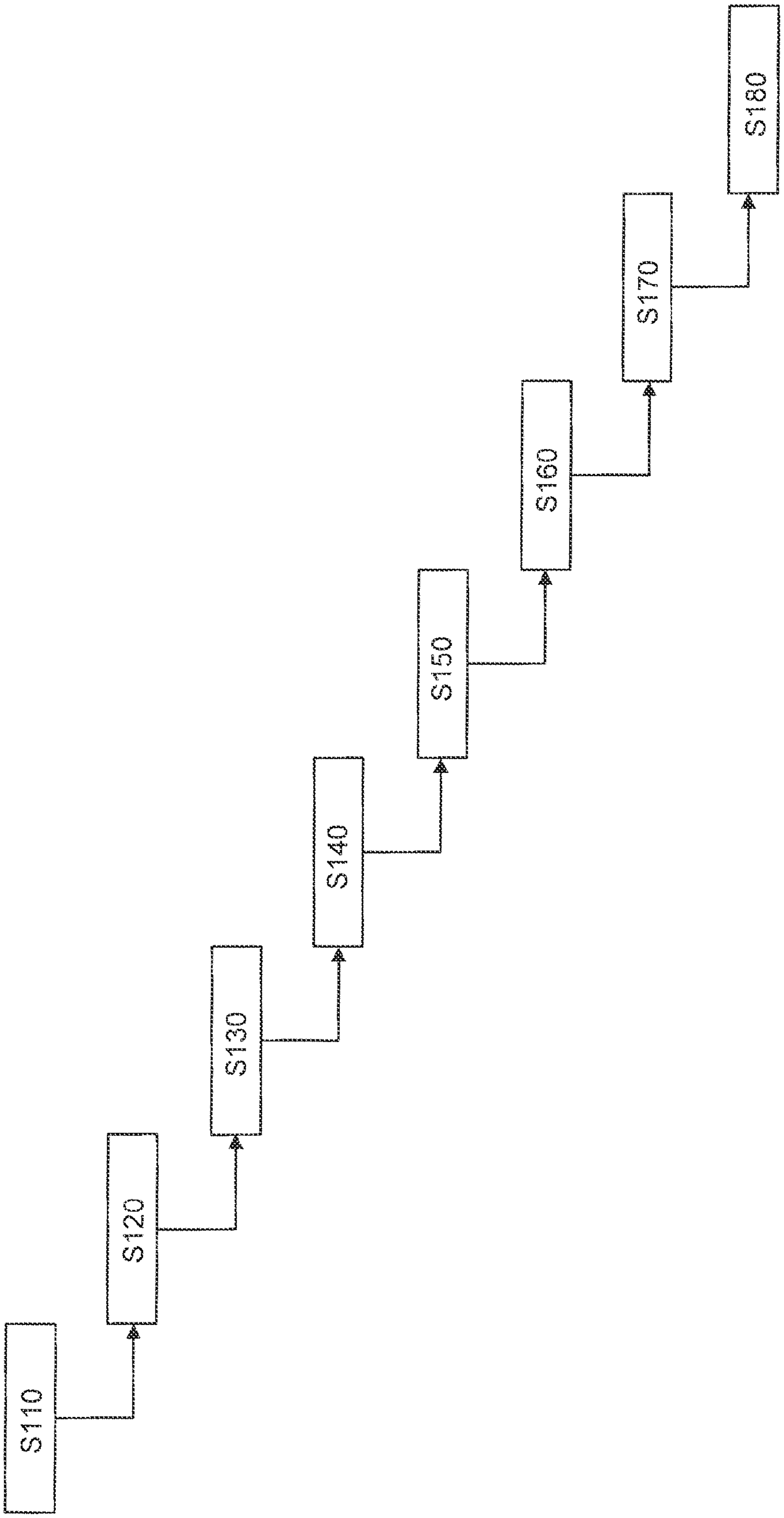
FIG. 5A shows a flowchart having the steps of a setting technique being an embodiment of the present invention.
Figure 5B:
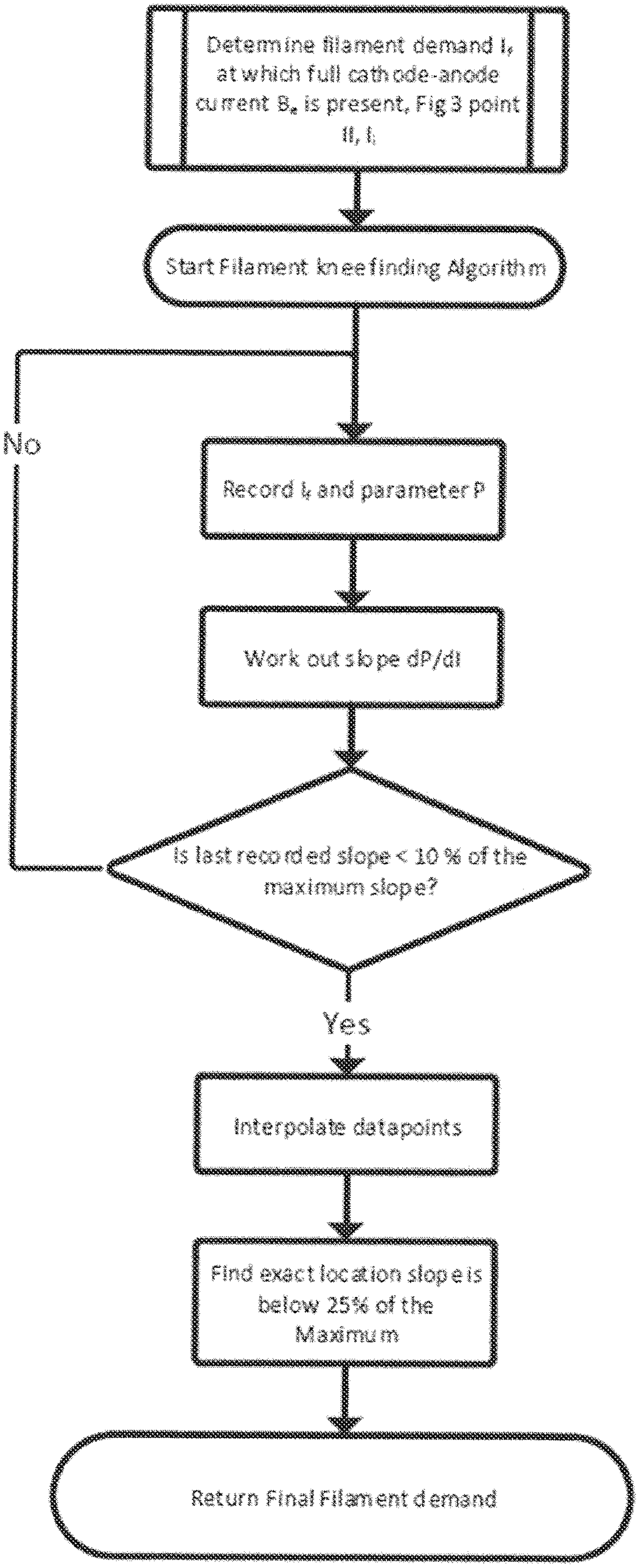
FIG. 5B shows a flowchart having the steps of a variant setting technique being an embodiment of the present invention.

This corresponds to the situation shown in FIG. 4A, in which the grid and the filament are at the same potential, and the dashed equipotential lines lie on the surface of the filament and the grid electrode 112.

Next, at step S120, controller 190 increases the filament demand from the previously-set value towards a second value $I_f$. The second value may represent a maximum acceptable filament current, and again may be retrieved from memory MEM or may be set according to data received by the user interface controller UIC. The second value need not be known in advance, and generally increasing filament demand without knowledge of a specific upper value is also to be regarded as increasing filament demand towards an upper value.

As the filament demand is increased towards an initial imaging filament demand $I_i$, the filament 111 becomes hot enough to generate free electrons. This still corresponds to the situation shown in FIG. 4A, in which the grid and the filament are at the same potential, and the dashed equipotential lines lie on the surface of the filament and the grid electrode 112.

Eventually a desired beam current between filament 111 and anode 117 is attained, which is typically to be maintained for proper operation of the x-ray apparatus 100. This may be termed the beam current set point, and may be determined by the current supplied to the filament.

Figure 3:
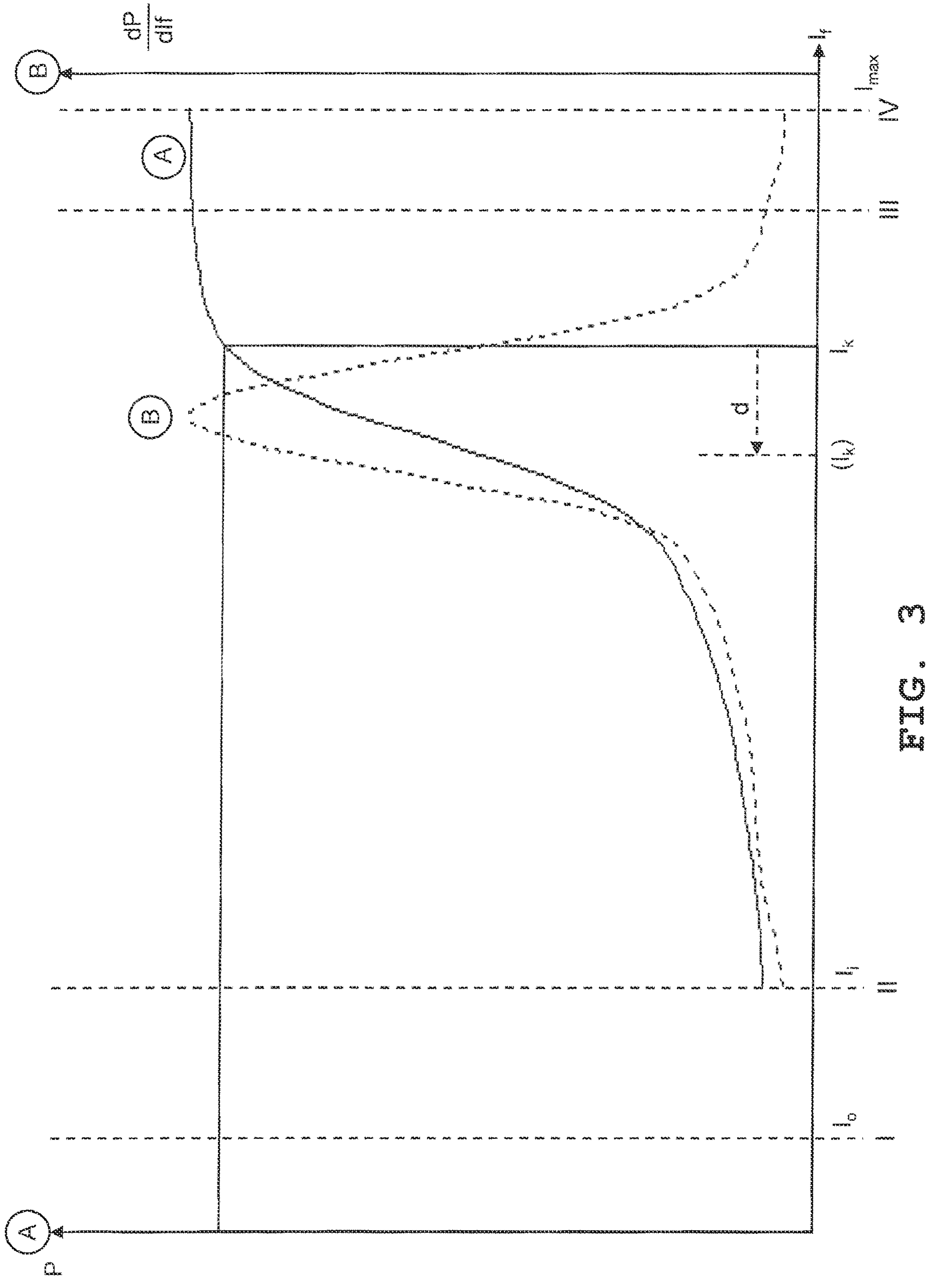
FIG. 3 shows a relationship between parameter P and filament demand $I_f$ in the form of a schematic graph showing on the left axis the progression in parameter P as the filament demand $I_f$ is varied from an initial to a final value, and on the right axis the progression in the slope, or first derivative, of parameter P as the filament demand $I_f$ is correspondingly varied.
Figure 4B:
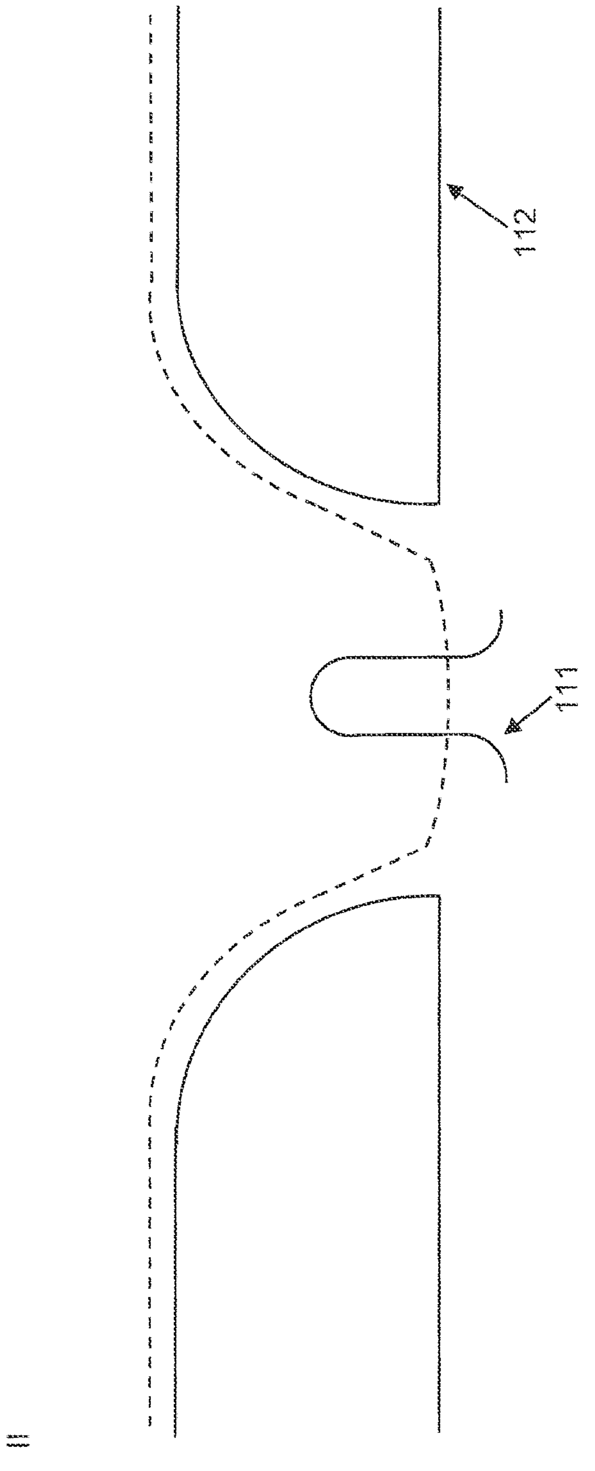
FIG. 4B shows a potential at the filament at a state corresponding to state II shown in FIG. 3.

As the filament demand reaches the initial imaging filament demand $I_i$ the beam current $B_e$ reaches the beam current set point corresponding to state II shown in FIG. 3, with reference also to FIG. 4B. In FIG. 4B, the grid 112 has a lower potential than the filament 111. The equipotential line, represented by the dashed line in FIG. 4B, is at filament potential. Electrons emitted below this line will not be accelerated towards the anode 117, and thus the target 113, but electrons emitted above this line will be accelerated towards the anode 117, and thus the target 113. It is notable in FIG. 4B that as the area of the filament which emits electrons to form electron beam $B_e$ is large, the electron beam $B_e$ is very divergent and a large proportion of the emitted electrons are lost at the anode 117 rather than passing through anode 117 to reach target 113.

Figure 4C:
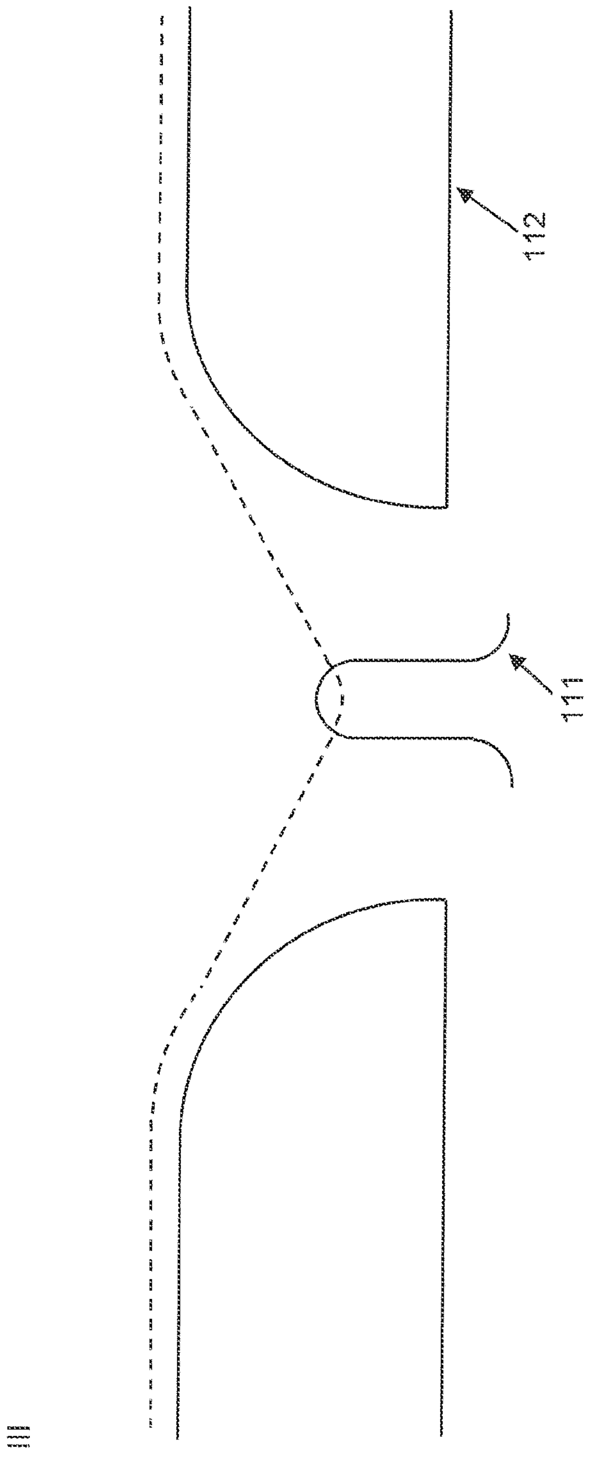
FIG. 4C shows a potential at the filament at a state corresponding to state III shown in FIG. 3.

If the filament demand $I_f$ is increased further, the generation of free electrons by filament 111 will also increase, according to the well-known Richardson's equation. The proportion of electrons being accelerated towards the target is regulated by the grid potential $V_g$. As shown in FIG. 4C, representing a state in which the grid potential $V_g$ is more negative than the state shown in FIG. 4B, the dotted equipotential line is again at filament voltage, and electrons emitted below this line will not be accelerated towards the anode. The area of the filament which emits electrons to form electron beam $B_e$ is smaller than in FIG. 4B, and thus with a more negative grid potential $V_g$, the electron beam $B_e$ is less divergent. Consequently, a smaller proportion of the emitted electrons are lost at the anode 117, and a greater proportion passes through anode 117 to reach target 113.

To maintain the beam current set point at a predetermined level, as the filament demand is further increased, the potential $V_g$ of grid 112 is progressively adjusted to maintain the beam current $I_B$ at the beam current set point. Such adjustment, for example, may be by means of a feedback loop implemented by controller 190, high voltage generator HVG or gun control unit GCU.

Accordingly, appropriately adjusting the grid potential as described above allows the beam current $I_B$ to be maintained at the set point throughout the adjustment of the filament demand $I_f$. Moreover, as the filament demand $I_f$ increases, due to the adjustment of the grid potential $V_g$, the area of the filament which emits electrons to form the electron beam $B_e$ becomes smaller, the electron beam $B_e$ becomes less divergent, and a greater proportion of the emitted electrons pass through anode 117 to reach target 113.

Once the beam current $B_e$ reaches the beam current set point corresponding to state II shown in FIG. 3, with reference also to FIG. 4B, at step S130, controller 190 further increases the filament demand from the first value corresponding to the initial imaging current $I_i$ towards the second value corresponding to the higher filament current, the controller acquires imaging data $D_{IMG}$ from X-ray detector 130 and obtains, based on image data $D_{IMG}$, a parameter P which correlates with the image quality of the image formed on X-ray detector 130.

For example, the parameter P may be an intensity, a contrast-to-noise value, a sharpness value, a noise value, a resolution value, a dynamic range value, or a contrast value. The determination of such values is known to those skilled in the art. For example, a resolution may be measured by performing a Fourier transform, for example by a Fast Fourier Transform (FFT) algorithm, of an image of an edge, pinhole or JIMA chart. The resolution measurement may be selected as the spatial frequency corresponding to a particular Modulation Transfer Function (MTF) value, such as a 50% value. The parameter may be based on an average value for the entire image represented by imaging data $D_{IMG}$, or may be based on an average value for a predetermined region of the image. The region of the image may be received through user interface controller UIC from a user input device such as a control console or control panel, according to a command of a user.

During such measurement, a test object may be arranged in place of the sample S to provide a reference object for determining image quality. Such a reference object may be manually placed by the user or may be automatically arranged at the place of the sample, for example by a slide mechanism, robot arm, or other positioning mechanism. Such a test object may be a pin-hole, an edge, a pair of spheres or a chart providing test patterns such as JIMA-0006-R:2006 provided by JIMA (Japan Inspection Instruments Manufacturers' Association).

As explained above, during this process, the potential $V_g$ of grid 112 is progressively adjusted to maintain the beam current $I_B$ at the beam current set point.

Step S130 is repeated until at least two measurements of the parameter P have been obtained. Each parameter P is associated with a respective value of filament demand $I_f$, and stored in memory MRM. More than two such measurements may be acquired at step S130. The plurality of measurements so obtained from a series of measurements.

Next, based on the series of measurements of parameter P, controller 190 detects a knee in the measured parameter. The knee of a parameter may on one definition be taken to be a point where the curvature (the second derivative, or convcavity) of the parameter has a local absolute maximum. In the following, the knee is associated with a local negative maximum, that is, a minimum, in the curvature of the measured parameter. Accordingly, at step S140 controller 190 determines the curvature of the parameter P relative to the filament demand $I_f$, and identifies a knee in the value of filament demand based on the curvature. The identification may, for example, be performed by identification of a point where the curvature of the parameter has a local absolute maximum, for example, a local negative maximum, or minimum.

Controller 190 may determine the curvature of the measured parameter based on a slope of the rate of change (first derivative), that is, the second derivative, of the parameter P with respect to the filament demand $I_f$. Such a second derivative may be determined by fitting a curve, such as a quadratic curve to the acquired measurements of the parameter P, and calculating the second derivative of that curve. Such a second derivative may also be calculated directly from the measurements acquired by numerical methods.

The curve may be fitted to the acquired measurements in a window of predetermined size. The controller may be configured to smooth the data relating to the parameter P by a smoothing algorithm such as a Savitzky-Golay filter before determining the curvature of the parameter P. Alternatively, relatively fewer points may be measured, and a curve generated by interpolating, for example by means of a spline interpolation.

Next, at step S150, the process of step S130 to increase the parameter and the process of S140 to determine the curvature is repeated, and a local maximum of the curvature is detected by comparison of previously-determined values of the curvature of the parameter P with respect to the filament demand.

In FIG. 3, the value of the parameter P is shown as the solid line A on FIG. 3, while the value of the slope of the curve, shown as dashed line B, and which may be understood as being the derivative of the parameter P with respect to the filament demand $I_f$. Accordingly, the knee point in the filament demand $I_f$ may be identified as value $I_k$ at which the slope of the curve becomes an absolute (negative) maximum, or alternatively a minimum.

The local maximum may be identified as a highest value of the curvature after a maximum in the slope, determined within a window, the window also including subsequently-acquired values of the curvature which are lower than the local maximum. The window may comprise all values acquired since step S150, or may comprise a more limited set of values, such as a predetermined plurality of recent values. Step S160 may continue until the second value (maximum value) of the filament demand $I_f$ is reached, or may continue only until the local maximum of the curvature has been determined, or until a defined state thereafter. For example, step S160 may continue until the slope (first derivative) of the curve is less than a predetermined percentage, such as 10% or 5% of the maximum slope of the curve, or may continue for a predetermined number of data points.

In an alternative approach, a value of the knee may be determined by an approximate method as a point at which the slope of parameter P reaches, after a maximum in the slope, a predetermined percentage of the maximum in the slope. For example the value of the knee may be determined as the point at which the slope of the parameter P falls to a value which is, for example, between 25% and 5%, e.g. 25%, 20%, 15%, 10% or 5%, of the maximum slope.

In one implementation, the filament demand is increased while measuring the slope of parameter P, and a point at which parameter P has fallen to a first percentage of the maximum slope is identified, for example 10%. Once this point is identified, interpolation, such as spline interpolation, may be applied to generate a curve of which the slope can be calculated with greater resolution. Based on the generated curve, a point at which the slope has fallen to a second percentage of the maximum slope, for example 25%, is identified, and determined as the knee value.

Such an approach may offer computational advantages in terms of the ease of calculating the slope or first derivative as compared with the second derivative. Such an approach is shown in the exemplary flowchart of FIG. 5B.

In a further alternative approach, a value of the knee may be determined by a reverse process, in which the filament demand is set to a relatively higher filament demand than a value stored in the memory MEM of the controller 190 or input by a user. Such a demand may correspond to a previously-determined knee value. Then, rather than progressively increasing the filament demand as described above to find the knee, the filament demand may be progressively reduced while measuring the parameter P. A knee point of the curvature may be detected by processes corresponding to the methods described above, or by comparison of previously-determined values of the curvature of the parameter P with respect to the filament demand. For example, a knee point may be determined when parameter P is reduced to a predetermined percentage or absolute value of the highest point of parameter P, or the slope of parameter P increases to a predetermined value.

Figure 10:
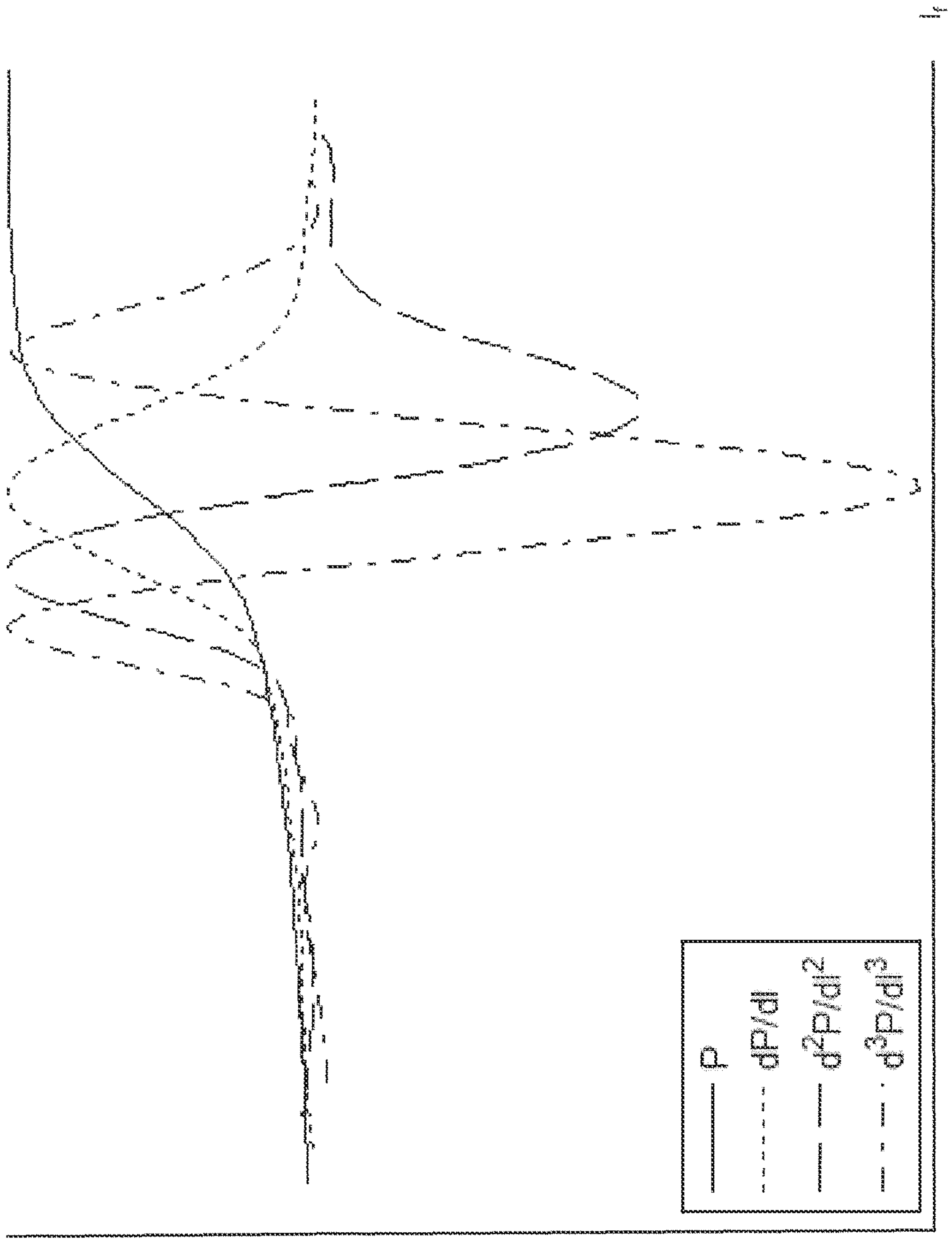
FIG. 10 shows a relationship between a curve of parameter P with filament demand $I_f$ and first and further derivatives of the parameter P with respect to filament demand $I_f$.

In a yet further alternative approach, higher-order derivatives of the parameter P with respect to filament demand than the first derivative or slope and the second derivative or curvature may be used to identify a knee in the parameter P. For example, as shown in FIG. 10, the third derivative of parameter P may exhibit a first maximum, a minimum, and a second maximum. According to requirements, an approximate value of the knee in parameter P may be identified based on the first minimum, the second maximum, a position between the first minimum and the second maximum, a weighted average of the first minimum and the second maximum, or an offset or percentage of a selected maximum or minimum. Moreover, using a fourth or higher derivative, a selected maximum or minimum slope of the third derivative or a certain percentage or fraction of the position of minimum/maximum slope may be selected as an approximate value of the knee point. Rather than maxima or minima, zero crossings of the relevant derivative may be used as a basis on which to approximate the position of a knee.

In one further alternative, crossings of tangents to the curve in parameter P with respect to filament demand may be used to identify an approximate knee point. For example, a tangent of the steepest slope and a tangent at the largest filament demand value may be identified. A value of filament demand at which these two tangent lines cross may be determined as an approximate values of the knee point.

In an even yet further alternative approach, the knee point may be identified as a position corresponding to a certain percentage of a maximum in parameter P.

Moreover, other approaches to identifying a knee in the parameter P can be applied, without limitation. It is noted that in principle any feature of the curve of parameter P with filament demand can be used as a basis on which to establish an approximate knee value, provided that such feature is repeatedly identifiable.

Next, at step S160, based on the detected knee, a filament demand knee value $I_k$ is set as the value of the filament demand $I_f$ at which a knee is determined to exist in parameter P. Based on the determined filament demand knee value $I_k$, a filament demand set point $I_s$ is established. For example, the filament demand set point $I_s$ may be established as a value of the filament demand which corresponds to a value which is the same as the filament demand knee point. Alternatively, the filament demand set point $I_s$ may be established as a value of the filament demand which corresponds to a value ($I_k$) which is lower than the filament demand knee point by an offset quantity d shown in FIG. 3.

Further alternatively, the filament demand set point $I_s$— may be established as a value of the filament demand which corresponds to a value which is proportionately lower than the filament demand knee point. Yet further, alternatively, a value of the filament demand which corresponds to a value which is proportionately or absolutely higher than the filament demand knee point. If the filament demand is set lower than the knee, the image quality will tend to reduce, but filament lifetime will tend to increase. If the filament demand is set higher than the knee, the image quality will tend to increase, but filament lifetime will tend to reduce.

At step S170, the filament demand $I_f$ is set to the value of the filament demand set point $I_s$, and the x-ray apparatus may be placed into operation for investigation of the sample S. Where a manually-placed reference object is used for determining the parameter P, the object may be removed before the sample S is introduced. Where the reference object has been introduced automatically, the reference object may automatically be withdrawn from the path of the x-ray beam $B_x$.

At step S180, image data $D_{IMG}$ is acquired and stored for further analysis.

Accordingly, in implementing the above-described procedure for setting the filament demand, the controller 190 causes the filament demand $I_f$ to be increased from value I0 until a knee point in the filament demand IF is identified. When the knee value $I_k$ is identified, the controller calculates a set value for the filament demand $I_s$ based on the identified new value $I_k$.

In other configurations, a predetermined absolute or proportional offset d may alternatively or additionally be used to calculate the set filament demand $I_s$ based on the identified filament demand knee $I_k$.

If the filament demand were to be further increased beyond the knee point $I_k$, the point shown with III in FIG. 3 and in FIG. 4C is reached in which the maximum space charge due to the emitted free electrons from filament 110 is reached, corresponding to a maximum emitted electrons per unit area. If the filament demand were then to be further increased to the situation shown as IV in FIG. 3, the filament would become overheated, and although the equipotential line shown as a dotted line in FIG. 4C would move further up the filament, thereby providing a smaller filament area emitting electrons, as the maximum space charge has already been reached, and no further enhancement of image quality is possible. Accordingly, the parameter P does not increase further from III to IV. Under such conditions, filament 111 will be overheated, and thus the operating lifetime of the filament will be significantly reduced.

Therefore, by implementing the technique described above, it can be avoided that the point of III in FIG. 4C is closely approached, reached or exceeded and the filament is overheated during the process of setting the filament demand. Operating the filament at high temperatures is associated with a shortened lifetime of the filament in operation, and accordingly by following the disclosed technique, the lifetime of the filament may be improved.

In the above-disclosed technique, the controller 190 can progressively increase the filament demand from a low value towards a high value, determining the value of the parameter as the filament demand is increased, such that a knee point $I_k$ can be identified based on the changing curvature of the parameter P relative to the filament demand in real time.

Such a variant has the advantage that if a knee is found at a relatively low value of the filament demand, the filament demand need not be increased significantly above this point in order to obtain a set value $I_s$ for the filament demand, thereby avoiding the elevation of the filament temperature to an excessive value, even for a short period.

However, in practice, it may be necessary to overshoot the filament demand knee $I_k$ by a certain amount to confirm the presence of a local maximum in the curvature of the filament demand $I_f$. In particular, a phenomenon has been observed of a double knee, especially if the x-ray apparatus 100 is misaligned. As the filament demand is increased, the parameter P may temporarily not increase. To avoid such a situation, the technique may temporarily overshoot the knee point. Accordingly, the behaviour of the parameter P after the knee point as consistent with a properly-aligned system may be confirmed with an expected behaviour of the parameter P after the knee point. This involves temporarily running the filament at a more elevated temperature than necessary in order to confirm that the correct knee point has been identified. Such overshoot can be for a very limited amount of time, so as to minimise the impact on the lifetime of the filament.

In an alternative technique, the controller 190 may vary the filament demand across a predetermined range of filament demand values in order to identify a knee point within those values. In other words, the filament demand may be varied across the entirety of a predetermined range, such as from $I_0$ to $I_{max}$ shown on FIG. 3, before the filament knee is identified. Such a technique may have an advantage to ensure that the knee point is identified with greater certainty. In some embodiments, the values of $I_o$ and $I_{max}$ may be set based on a range in which the knee point is expected to be located. In some embodiments, such a range may be determined based on one or more knee-points previously identified.

It is noted that the above description has been given with regard to the filament demand as represented by a filament current $I_f$. However, the same procedure can be applied, with equivalent effect, based on the potential which is applied by filament current supply 150 across filament 111 to heat filament 111. In other words, filament supply 150 may equivalently be a constant-current supply or a constant-voltage supply.

Although the above technique can be used to establish a filament demand for the X-ray machine which may be maintained throughout a period of operation of the X-ray machine, in some circumstances it may be advantageous to repeat the method at intervals.

In particular, as the filament ages in operation, the filament typically degrades. Such degradation may be due, among other factors, to localised evaporation, which results in thinning of the filament. As a result, the resistance of the filament typically increases over its operating lifetime. This process of degradation may accelerate until a hot spot melts or breaks, leading to failure of the filament. Therefore, for a given filament demand value, over time the power dissipated in the filament and hence the temperature of the filament will increase according to the laws of Ohmic heating.

If the filament demand is set only once, after a while the filament will be being operated in a state in which it is inappropriately hot. However, this will typically not be noticed by the user since the image quality does not increase past the filament demand shown as state III in FIG. 3.

By repeating the technique described above after a period of operation of the machine, a new filament demand value can be identified while avoiding operating the X-ray apparatus in a condition in which the filament is excessively hot for an extended period of time.

In particular, by comparison with a technique in which one filament demand is set for all beam currents and beam potentials, an enhancement of filament life time enhancement of a factor of two or more may be obtained.

Such a period of operation may be a period of operation selected such that the filament temperature or filament demand needed to maintain a defined filament temperature is expected to have changed by at least a certain proportion, such as a proportion between 20% and 1%, e.g. 20%, 10%, 5% or 1%.

In some circumstances, the technique may be repeated based on the elapsed clock time since the previous setting of the filament demand. For example, the technique may be repeated at least twice per day, at least once per day, at least twice per week, at least once per week, at least once per fortnight, or at least once per month. In such a case, the controller 190 may compare a current clock time with a time of last setting of the filament demand, and may automatically perform the technique if a predetermined time is exceeded.

Such automatic performance may be conditional, for example, on a restart of the x-ray apparatus 100 or may be conditional, for example, on completion of a measurement operation or sequence of measurement operations of the x-ray apparatus 100. Such automatic performance may give a user of the x-ray apparatus 100 the option to postpone or omit a repetition of the setting technique, for example by notifying a user that a repetition of the technique is scheduled through user interface controller UIC to a user output device such as a control console or control panel, or display screen, and then receiving a command to postpone, to omit, or to initiate a repetition so through user interface controller UIC from a user input device such as a control console or control panel.

Whether the technique is to be repeated automatically or manually by a user, controller 190 may notify a user that the technique should be repeated by providing a notification to do so through user interface controller UIC to a user output device such as a control console or control panel, or display screen. The notification may be a warning that automatic performance is scheduled, for example that automatic performance will take place after completion of the next measurement, or after a notified period has elapsed, or may be an invitation for the user to initiate performance of the technique. Such initiation may be by receiving a command to do so through user interface controller UIC from a user input device such as a control console or control panel.

Alternatively, the technique may be repeated based on the elapsed operating time of the X-ray apparatus, for example the elapsed time during which current is supplied to the filament, since the filament demand was previously set. In such a case, the controller 190 may record an amount of time since the filament demand was previously set and may compare the amount of time with a predetermined maximum amount of time for performance of the technique. In such a case, the controller 190 may automatically perform the technique if a predetermined time is exceeded as set out above, or may invite the user to initiate performance of the technique again as set out above.

Alternatively, the technique may be repeated each time the X-ray apparatus is switched on, after a predetermined number of times the x-ray apparatus 100 is switched on. In such a case, the controller 190 may count the number of times that the x-ray apparatus has been switched on since the filament demand was previously set and may compare the number of times with a predetermined maximum number of times for performance of the technique. In such a case, the controller 190 may automatically perform the technique if the predetermined maximum number of times is exceeded as set out above, or may invite the user to initiate performance of the technique again as set out above.

Alternatively, the technique may be initiated on demand according to a user request. Again, such initiation may be by receiving a command to do so through user interface controller UIC from a user input device such as a control console or control panel.

Obtaining a filament knee according to the above-disclosed technique moreover can be used to estimate a remaining filament operating lifetime for the filament in the X-ray apparatus.

In particular, for a given filament type, in terms of shape, structure and composition, a well-defined relationship exists between the operating lifetime of a filament at a particular filament demand and the detected knee in the curve of the parameter P relative to the filament demand $I_f$.

The filament operating life is here defined as the filament operating time from first operation of the filament to failure of the filament. The filament operating time is defined as the time in which the filament is heated according to the filament demand.

Typically, a filament fails when, due to degradation of the filament material under heating and ion back bombardment, it becomes so thin that the increase in heating due to the thinning of the filament causes the filament to melt and break. As the filament becomes thinner, the process of degradation of the filament tends to accelerate. The remaining filament lifetime at a particular time is then defined as the operating time, assuming a constant filament demand, from the particular time until the filament fails.

Figure 6:
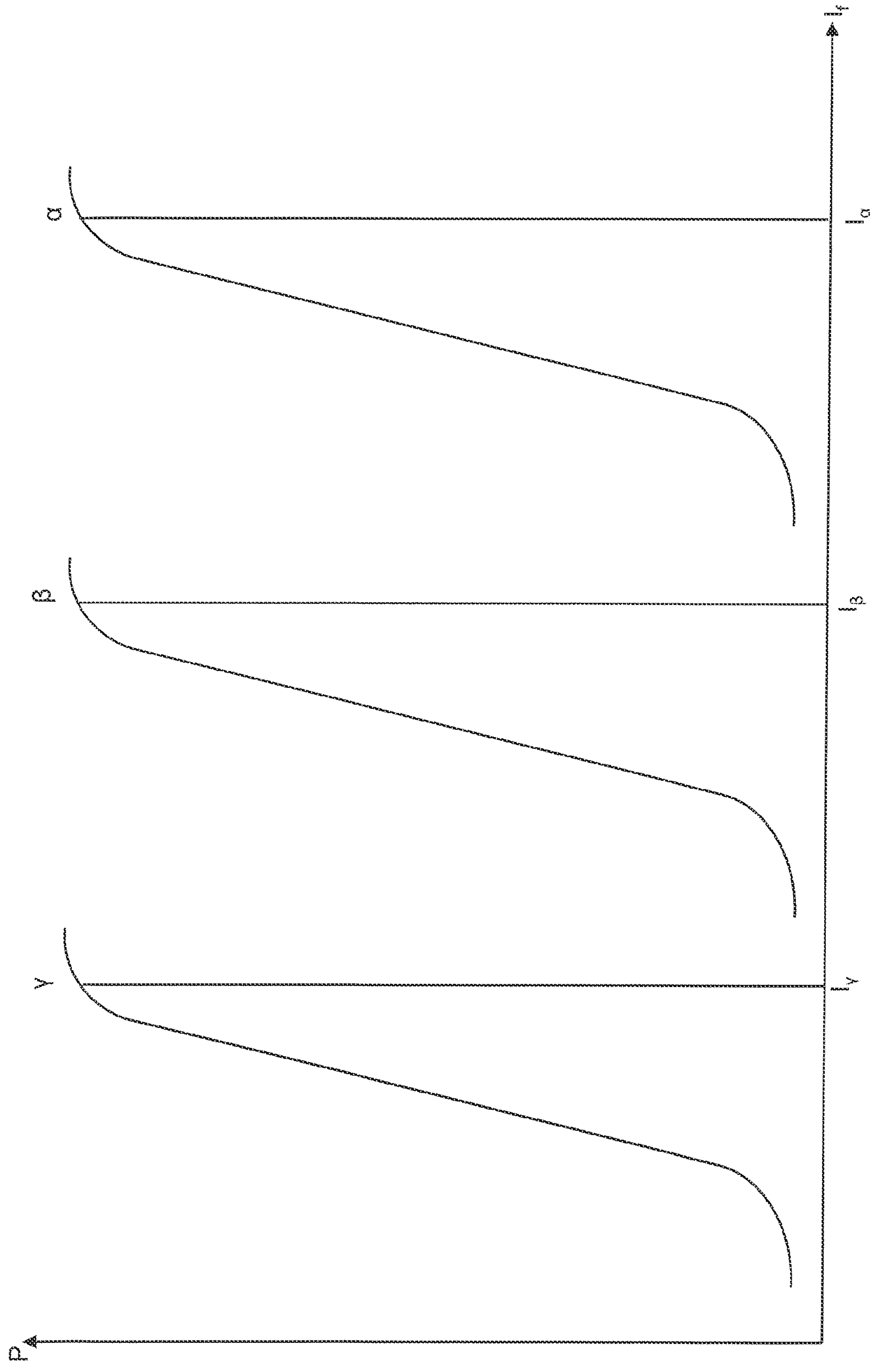
FIG. 6 shows a relationship between parameter P and filament demand $I_f$ at a series of points in time during the operating lifetime of the filament.

For example, as shown in FIG. 6, a filament of a particular type exhibits a shift in the characteristic curve of parameter P with filament demand $I_f$ as the filament is maintained in operation. With reference to FIG. 6, curve $\alpha$ represents a new filament, curve $\beta$ represents a filament which has been in operation for a certain amount of time, and curve $\gamma$ represents a filament which has been in operation for a longer amount of time. As may be appreciated from FIG. 6, the identified knee value $I_\alpha$ associated with curve $\alpha$ is greater than identified knee value value $I_\beta$ associated with curve $\beta$, and identified knee value value $I_\beta$ associated with curve $I_\beta$ is greater than identified knee value $I_\gamma$ associated with curve $\gamma$. That is, the identified knee value $I_k$ for a given filament decreases as the operating time of the filament elapses.

Moreover, the identified knee value $I_k$ for a given filament decreases as the operating time of the filament elapses in a predictable relationship, which depends on the type of the filament. This predictable relationship can be used to determine the remaining lifetime of the filament.

For example, the determined filament demand $I_s$ or the determined knee value $I_k$ can be compared with a known relationship between set filament demand and elapsed filament operating time for any particular filament or filament type, in order to determine the expected remaining time to failure, in other words the remaining filament lifetime. The elapsed operating time may be elapsed operating time from first operation of a filament.

Figure 8:
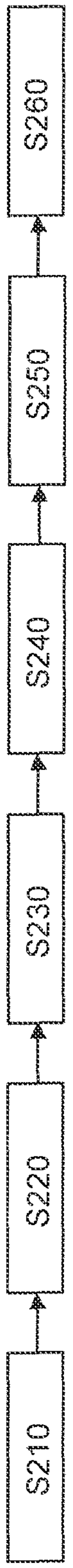
FIG. 8 shows a flowchart having the steps of a filament lifetime estimation technique being an embodiment of the present invention.

For example, the determination of a remaining lifetime of a filament will be explained with reference to the flowchart shown in FIG. 8.

A filament of a particular type exhibits a characteristic curve C which defines a relationship between the filament knee $I_k$ as determined in the above-disclosed technique with the elapsed filament operating time $T_0$. Such a curve may have the form of curve C shown in FIG. 7. Since filaments of a particular type exhibit a characteristic time to failure $T_f$, that is, a characteristic filament lifetime, under constant conditions, after a filament has been operating for a certain amount of time, which is shown as $T_1$ in FIG. 7, the filament demand knee has a certain characteristic value $I_1$. The characteristic curve C may be specific to a configuration of x-ray apparatus 100, and may be specific to an instance of the x-ray apparatus 100. Based on the knowledge of the characteristic curve C and the filament demand knee $T_1$, a predicted remaining time to failure of the filament, in other words remaining filament lifetime, can be established as $T_f$-$T_1$.

Accordingly, in a first step S210, a filament demand knee is identified and a value of a set filament demand is determined. Step S210 may be performed by, for example, steps S110 to S150 previously described.

In a second step S220, the filament demand of the apparatus 100 is set to the obtained value of the set filament demand and the x-ray apparatus 100 is placed in operation based on this filament demand. Setting of the obtained value may be performed by, for example, step S180 previously described. This set value of filament demand may be regarded as filament demand $I_1$ previously described.

In a third step S230, the filament is then maintained in operation at this filament demand. For example, one or more x-ray images may be acquired of one or more samples S using the set value of the filament demand. During this step, the elapsed operating time since the setting of the filament demand is measured by controller 190.

After operating the filament for a particular further length of time, until time $T_2$, for example, if the filament demand knee $T_k$ is subsequently determined, the filament demand knee will have reduced to a value $I_2$. As mentioned above, this is because the filament has thinned, and a smaller current is necessary to maintain a particular temperature in the filament and thus a particular space-charge density around the filament and thus flux of electrons in the electron beam $B_e$. Based on knowledge of the curve C and the determined filament demand knee $I_2$, a new remaining time to failure may be established as $T_f$-$T_2$.

Figure 7:
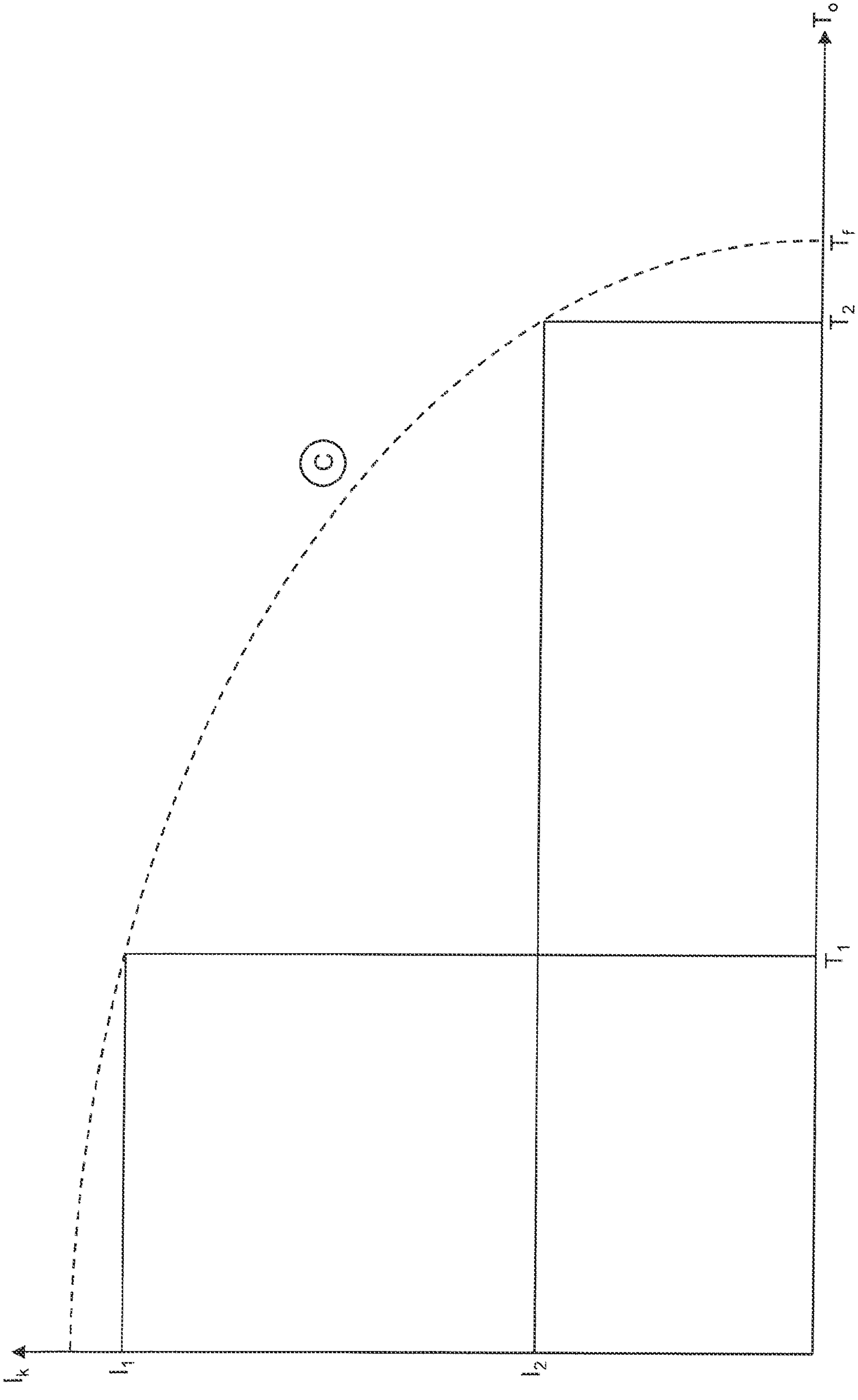
FIG. 7 shows a relationship between appropriate filament demand with operating time of the filament in the form of a curve.

The relationship shown in FIG. 7 holds for particular values of operating parameters of x-ray apparatus such as filament demand, beam current $I_B$ and beam potential $V_B$ between filament 111 and anode 117.

Accordingly, in a fourth step S240, the identification of the filament knee is repeated. Step S240 may be performed by, for example, repeating steps S110 to S150 previously described. A new value of filament demand is obtained as filament demand $I_2$ previously described.

Then, in a fifth step S250, the controller 190 compares $I_1$, $I_2$ and the elapsed operating time $T_2$-$T_1$ between steps S230 and step S240 with curve C, and determines a new remaining time to failure $T_f$-$T_2$ based on the comparison.

Finally, in a sixth step S260, the controller makes available information about the remaining time to failure $T_f$-$T_2$, for example by storing information about a remaining time to failure in a memory for reading or by reporting information about the remaining time to failure with user interface controller UIC to a user interface output unit, such that a user can take note of the information. The information may be a value, such as a value of the remaining time to failure, or may be information on a state such as a warning flag or warning indicator for low remaining filament lifetime. In one embodiment, the controller may notify a supplier that the filament lifetime is low and thereby may place an electronic order for a replacement filament. Such notification may take place via a network such as the Internet or a GPRS or GSM mobile network according to well-known messaging protocols such as SMS or email.

Notably, the shape of curve C does not substantially change for a given filament type. Therefore, in order to predict remaining filament life, under different conditions, a set of such curves C may be stored, and the appropriate one selected for the relevant circumstances, including the particular filament life.

Alternatively, one curve can be stored, and then scaled according to the operating parameters of the x-ray apparatus. Such curves can, for example, be defined by an analytic formula, such as an algebraic formula, or can be generated based on interpolation with particular values of the curve. Such values may be previously obtained theoretically, or may be obtained from studies of the lifetime behaviour of filaments of a given type under different conditions.

In one implementation, the curve C may be stored as a representation in the memory MRY of the controller 190. Such a representation may be periodically updated, for example by loading data representing the representation into memory MRY via storage controller STC from an external storage device.

Alternatively, the controller 190 can measure and store the operating time of the filament for each repetition of the filament demand setting technique disclosed above, and can periodically update the representation based on the behaviour of the filament demand knee with operating time.

Such updating can include recording values of the filament demand relative to operating lifetime, and, optionally, interpolating those values to estimate the expected filament demand associated with intermediate values of the operating time between the times at which the filament demand knee was identified. Alternatively, the updating can comprise adjusting coefficients in an analytic representation of the curve C stored in memory MRY based on the measured values of the determined filament demand knee $I_k$ and the accumulated operating time $T_0$.

Moreover, since the appropriate filament demand may be predicted based on the accumulated operating time $T_0$ of the filament, following an initial setting of the filament demand $I_s$ based on a determination of a filament demand knee $I_k$, the filament demand may then be varied according to curve C in FIG. 7 based on a predicted value of the appropriate filament demand knee $I_k$. This may provide an alternative or additional mechanism for setting the filament demand after an initial filament demand has been determined, rather than performing a further repetition of the setting technique disclosed above of the filament demand knee $I_k$.

Additionally, if the identified knee $I_k$ is found to be inconsistent with curve C, for example by comparing the identified knee $I_k$ at a particular operating time with the expected knee based on curve C, then the identification of the knee can be repeated, for example until a consistent value is identified. If after one or more repetitions the identified knee is confirmed to be inconsistent with curve C, it may be indicative of a fault. Accordingly, on such a circumstance, the user may be notified of a fault condition, for example by providing a notification to do so through user interface controller UIC to a user output device such as a control console or control panel, or display screen. Alternatively, a fault condition can be notified to a management system, management department, user or service system, service department or service engineer. Such notification may take place via a network such as the Internet or a GPRS or GSM mobile network according to well-known messaging protocols such as SMS or email Curve C may be predetermined, or may be empirically determined based on prior measurements of the identified knee $I_k$ relative to elapsed filament operating time. For example, parameters of an algebraic representation of curve C may be updated based on one or more prior measurements, or curve C may be constructed over time based on one or more prior measurements. Estimation techniques, for example maximum likelihood estimation techniques, can be used to update curve C based on a history of previous measurements. Machine learning techniques can also be used to determine and/or update curve C based on a history of previous measurements. Such curves may be stored locally and associated with a particular apparatus 100, or may be copied or shared with other apparatus 100 of the same configuration. In some embodiments, measurements from several apparatus 100, or curves from several apparatus 100, may be combined to obtain a consensus curve by any of the above-indicated techniques.

Figure 9:
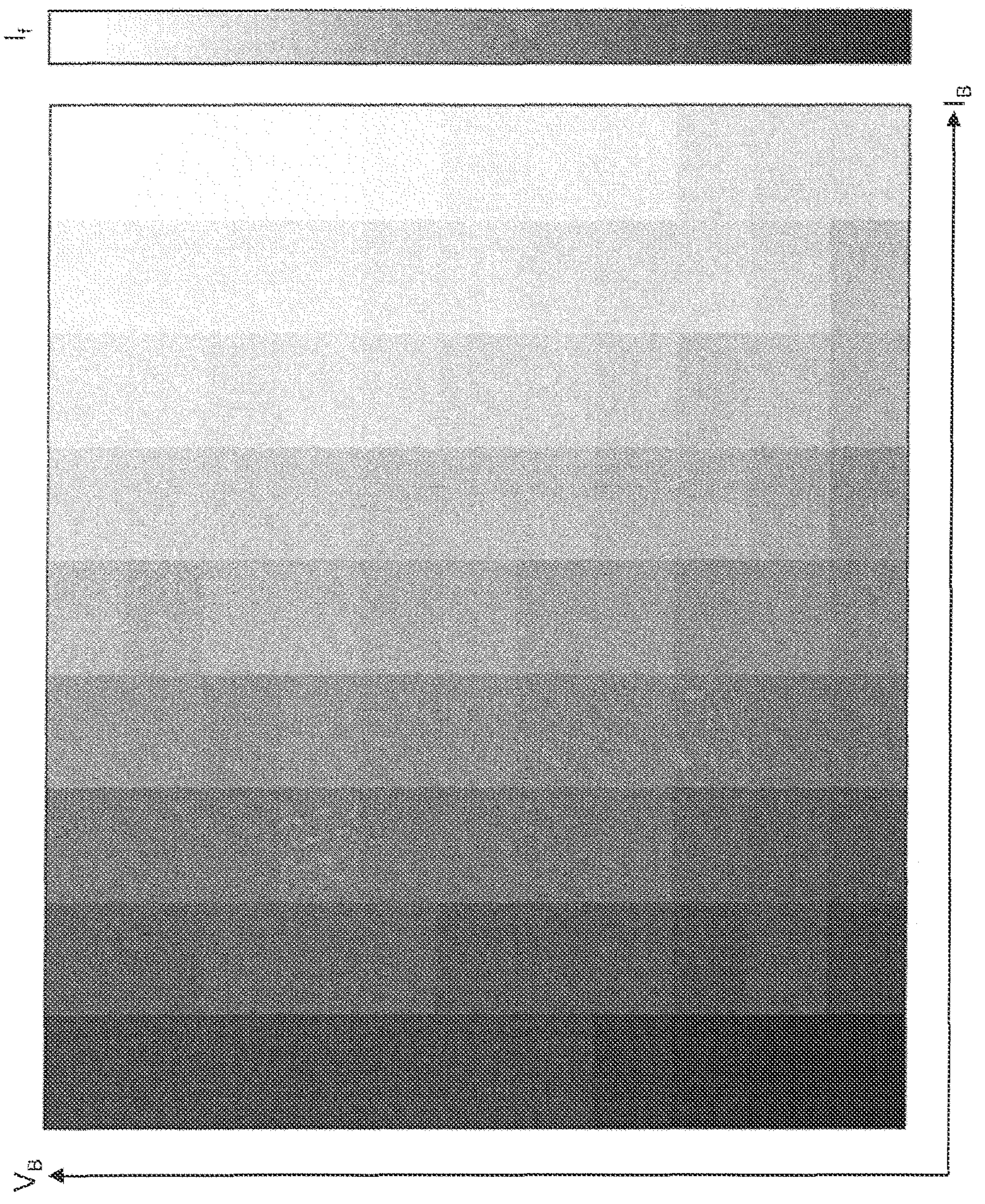
FIG. 9 shows a relationship between the beam voltage $V_B$ between the filament and, for example, the anode, the beam current $I_B$ between the filament and, for example, the anode, and the appropriate filament demand $I_f$.

Moreover, as shown in the exemplary map shown in FIG. 9, a consistent relationship exists between the beam current value $I_B$ measured between the filament and the anode, the beam potential $V_B$ between the filament and the anode, and the filament demand. Such a relationship may be expressed as a map as shown in FIG. 9, as a set of values in a look-up table, as a 3d surface, as a set of curves, or as an analytic relationship between the quantities. The existence of such a relationship can again be used to determine an appropriate value of the filament demand based on a representation of the relationship between the filament demand, the beam current and the potential, for any desired set of circumstances. For example, given a filament demand value and a set of beam current value $I_B$ and beam potential $V_B$, if it is desired to adjust either or both of the beam current value $I_B$ and beam potential $V_B$, it is not necessary to re-determine the appropriate filament demand value. Rather, the relationship exemplified in FIG. 9 may be used to identify an appropriate new filament demand value for the adjusted quantities. After such a determination, the new filament demand value can be set and the apparatus placed in operation for the new measurement under the new conditions of beam current value $I_B$ and/or beam potential $V_B$.

Advantageously, the map of FIG. 9 scales according to filament demand. That is, the values of the filament demand associated with each set of beam potential and beam current may straightforwardly be determined after a new determination of appropriate filament demand by the techniques disclosed above. Such a new determination may be for example as a consequence of prolonged operation of the x-ray apparatus 100. Based on the new determination, a new relationship, for example a new map, may be determined by correcting each of the values in the map according to a correction factor determined based on the difference between the formerly appropriate filament demand and the newly-determined filament demand. Such a correction factor may be a proportionate scaling, such that each value in the map is adjusted by the same correction factor, such as a scaling constant, applied to each value.

By implementing the disclosed technique, an appropriate value of the filament demand can be obtained without expert knowledge by the user.

For example, if the filament demand was set by a user under conditions corresponding to a low current and low potential, the appropriate filament demand may typically also be low. If then the apparatus 100 were adjusted to operate at a higher beam current and beam potential, the image quality would degrade.

In contrast, if the filament demand were set by a user under conditions corresponding to a high beam current and a high beam potential, the appropriate filament demand may typically also be high. If then the apparatus 100 were adjusted to operate at a lower beam current and beam potential, the image quality typically may not increase. However, the filament demand may then be inappropriately high. Operating at an inappropriately high filament demand will typically lead to a reduced filament life as compared with operating at an appropriate filament life.

Accordingly, by implementing the disclosed technique, appropriate image quality can be assured while allowing an increase in filament life as compared with an inappropriate setting of the filament demand.

It is noted that in the above, reference has been made to the determination of a parameter based on the measured image quality by detector 130 using controller 190. However, other quantities which correlate with the image quality, but which are not based on any measurement using detector 130, may also be used as the parameter for determining the filament demand knee. Here, correlation with image quality may refer to quantities which behave in the same way with respect to filament demand as image quality, and may more particularly refer to quantities which have a proportional or substantially proportional relationship to image quality.

For example, controller 190 may be configured to measure the electron beam current from the filament 111 to the target 113. This is directly related to the intensity of the X-ray as generated by target 113, and hence with the quality of the image determined by detector 130. Such a measurement can be made by measuring the current supplied by target potential supply 180, which may be reported by target potential supply 180 through input/output unit IO. Such a measurement could be performed, for example, by placing a resistor between the target and the target potential supply 180 and measuring the voltage drop across the resistor with a voltmeter.

Moreover, any other parameter which correlates with image quality at the X-ray detector 130, for example any parameter which correlates with the intensity or flux of X-rays emitted by target 113, can equivalently be used as parameter P for setting the filament demand $I_f$.

As a further example, an electron beam spot size on the target, or an electron beam spot intensity on the target also correlate with the intensity or flux of X-rays emitted by the target, and therefore may be used as the parameter. Such can be detected, for example, by placing a layer of scintillator over the target 113 or temporarily in place of the target 113 so as to intersect the electron beam $B_e$ emitted by the filament 111, and observing the scintillator, for example with a Charge Coupled Device (CCD). Alternatively, the x-ray intensity from target 113 could be observed with a scintillator arranged to cover window 116, and again observed with a CCD.

In the above description, reference has been made to controller 190 implemented as shown in FIG. 1 using a central processing unit CPU and ancillary components MEM, INS, IO, UIC and STC. However, such a controller can also be implemented using discrete electronics, programmable logic controllers, general purpose industrial controllers, or appropriate instructions loaded on suitably-configured general purpose data processing equipment, such as a workstation, personal computer or laptop.

Such a controller may also be provided by a hybrid configuration, including dedicated control electronics under the control of commodity computer hardware. The controller 190 may be localised in a single location, or may have discrete components which are networked together. In particular the controller 190 may control several such x-ray apparatuses 100 as a common controller, or several such controllers 190 may be controller via a common user interface, for example such as a networked terminal or Keyboard-Video-Mouse switch.

The essential functionality as described above will however be unchanged, as one skilled in the art will straightforwardly appreciate.

Accordingly, the present disclosure also encompasses a controller for an X-ray apparatus configured to perform the techniques disclosed herein, a control program for an X-ray apparatus comprising machine-readable instructions which, when executed, cause an X-ray apparatus to perform the techniques disclosed herein, and a non-transitory storage medium storing such a program in machine-readable form.

Moreover, as will be immediately apparent to those skilled in the art, the concepts of the present disclosure can be implemented without limitation in a range of circumstances and in alternative and equivalent modes, which may be appropriate to particular requirements. In particular, the configuration of X-ray apparatus and controller herein shown and described are fully exemplary, and the present techniques can generally be applied to any form of X-ray apparatus without limitation.

Accordingly, the scope of the claimed invention is solely to be determined with respect to the appended claims.

The invention claimed is:

1. A method of setting a filament demand in an x-ray apparatus, the x-ray apparatus comprising:

a filament, through which the passing of a heating current allows thermionic emission of electrons from the filament, a target, arranged to generate x-rays from the electrons emitted from the filament, a detector, arranged to detect x-rays generated by the target for forming an x-ray image, and a controller, wherein the controller is configured to perform a measurement operation of the x-ray apparatus to measure a parameter of the x-ray apparatus; and to set a filament demand for the filament, the filament demand correlating with the current passed through the filament, the method comprising:

varying the filament demand between a first value corresponding to a lower filament current and a second value corresponding to a higher filament current;

measuring the parameter at a series of values of the filament demand between the first value and the second value;

detecting a knee in the measured parameter;

determining the filament demand corresponding to the detected knee in the parameter; and setting the filament demand for the x-ray apparatus based on the determined filament demand corresponding to the detected knee in the parameter.

2. The method of claim 1, wherein the controller is configured to measure the parameter on the basis of the detection of the x-rays by the detector.

3. The method of claim 2, wherein the parameter is an objective measurement of image quality.

4. The method of claim 3, wherein the parameter correlates with one of the sharpness, noise, dynamic range, resolution or contrast of an x-ray image derived from the x-rays received by the detector.

5. The method of claim 2, wherein the parameter correlates with the contrast-to-noise ratio of an x-ray image derived from the x-rays received by the detector.

6. The method of claim 2, wherein the parameter correlates with the intensity of the x-rays received by the detector.

7. The method of claim 2, wherein the parameter is a measurement of the contrast-to-noise value in an x-ray image derived from the x-rays received by the detector.

8. The method of claim 1, wherein the parameter correlates with a beam current between the filament and the target, an electron beam spot size on the target, or an electron beam spot intensity on the target.

9. The method of claim 1, wherein the setting of the filament demand comprises setting a filament demand which is equal to or lower than the filament demand corresponding to an identified knee by a predetermined proportional or absolute amount.

10. The method of claim 1, wherein the setting of the filament demand comprises setting a filament demand which is higher than the filament demand corresponding to an identified knee by a predetermined proportional or absolute amount.

11. The method of claim 1, wherein identifying of the knee comprises determining a slope of the measured parameter as a function of the filament demand and selecting a value of the filament demand based on the determined slope as the value of the knee.

12. The method of claim 11, wherein the identifying of the knee comprises determining a value of filament demand at which the determined slope of the measured parameter is decreased to a set percentage of a maximum slope of the measured parameter between the first value and the second value.

13. The method of claim 11, wherein the determined value is the first such value determined between the first value and the second value, in order.

14. The method of claim 1, wherein the filament demand represents a set operating filament current.

15. The method of claim 1, wherein the filament demand represents a set operating filament voltage.

16. The method of claim 1, wherein the method is repeated at intervals over a service life of the filament and wherein the intervals are predetermined intervals based on an elapsed clock time since the previous repetition of the method of claim 1.

17. The method of claim 16, wherein the intervals are predetermined intervals based on an elapsed operating time since the previous repetition.

18. The method of claim 1, wherein the method is repeated at intervals over a service life of the filament.

19. The method of claim 18, further comprising a process of calculating a remaining lifetime of the filament based on the set filament demand.

20. The method of claim 19, wherein the set filament demand is recorded for each repetition or a subset of repetitions of the setting of the filament demand along with accumulated operating time of the filament, and wherein the process of calculating the remaining lifetime of the filament comprises comparing a representation of the set filament demand dependent on accumulated operating time to a predetermined representation of expected set filament demand against operating time and determining the remaining filament lifetime based on the comparison.

21. The method of claim 19, wherein the process of calculating the remaining lifetime of the filament comprises comparing the set filament demand to a predetermined representation relating set filament demand to filament lifetime and determining the remaining filament lifetime based on the comparison.

22. The method of claim 21, wherein the predetermined representation of set filament demand against remaining filament lifetime is an analytic representation.

23. The method of claim 21, wherein the predetermined representation of set filament demand against remaining filament lifetime is a curve or set of values.

24. The method of claim 21, wherein the predetermined representation of set filament demand against remaining filament lifetime is theoretically determined.

25. The method of claim 21, wherein the predetermined representation of set filament demand against remaining filament lifetime is empirically determined.

26. The method of claim 25, wherein the predetermined representation is established on the basis of received information relating set filament demand to remaining filament lifetime for a range of values of filament demand and filament lifetime.

27. The method of claim 26, wherein the predetermined representation is established based on previously-recorded values of set filament demand and accumulated operating time of a previously-installed filament in the x-ray apparatus.

28. The method of claim 1, wherein the filament demand is changed to a different filament demand after a beam current between the filament and the target or a potential between the filament and the target is changed.

29. The method of claim 1, wherein the filament demand is changed to a different filament demand after a beam current between the filament and the target or a potential between the filament and the target is changed and wherein the filament demand is changed to a different filament demand by repeating the varying, detecting, determining and setting steps of claim 1.

30. The method of claim 29, wherein the filament demand is changed to a different filament demand on the basis of a predetermined relationship between the filament demand, the beam current and the potential.

31. The method of claim 30, wherein the predetermined relationship is a relationship between the filament demand and one of the beam current and the potential, the ratio being associated with the other of the beam current and the potential.

32. The method of claim 30, wherein the predetermined relationship is determined by a map defining filament demand for each of pairs of beam current and potential.

33. A controller for an x-ray apparatus, the controller comprising data-processing equipment configured to cause the x-ray apparatus to perform a method in accordance with claim 1.

34. An x-ray apparatus comprising a controller as recited in claim 33.

35. A control program for an x-ray apparatus which is stored on non-transitory storage medium and which comprises machine-readable instructions which, when executed, to cause the x-ray apparatus to perform a method in accordance with claim 1.

* * * * *